(12) United States Patent
Zhang et al.

US008768098B2

(10) Patent No.: US 8,768,098 B2
(45) Date of Patent: Jul. 1, 2014

(54) APPARATUS, METHOD, AND MEDIUM FOR GENERATING PANORAMIC IMAGE USING A SERIES OF IMAGES CAPTURED IN VARIOUS DIRECTIONS

(75) Inventors: Hui Zhang, Yongin-si (KR); Keun-ho Kim, Seoul (KR); Do-kyoon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1049 days.

(21) Appl. No.: 11/902,648

(22) Filed: Sep. 24, 2007

(65) Prior Publication Data

US 2008/0074489 A1    Mar. 27, 2008

(30) Foreign Application Priority Data

Sep. 27, 2006 (KR) ................. 10-2006-0094127

(51) Int. Cl.
*G06K 9/40* (2006.01)
(52) U.S. Cl.
USPC ........... 382/294; 382/282; 382/284; 382/285; 348/36; 348/37
(58) Field of Classification Search
None
See application file for complete search history.

(56) References Cited

U.S. PATENT DOCUMENTS

| | | | |
|---|---|---|---|
| 5,262,856 A * | 11/1993 | Lippman et al. | 375/240.12 |
| 5,732,230 A | 3/1998 | Cullen et al. | |
| 5,987,164 A * | 11/1999 | Szeliski et al. | 382/154 |
| 5,991,444 A | 11/1999 | Burt et al. | |
| 6,292,593 B1 | 9/2001 | Nako et al. | |
| 6,754,379 B2 * | 6/2004 | Xiong et al. | 382/154 |
| 6,831,643 B2 * | 12/2004 | Aliaga et al. | 345/427 |
| 6,930,703 B1 * | 8/2005 | Hubel et al. | 348/37 |
| 7,450,839 B2 * | 11/2008 | Lee et al. | 396/322 |
| 2002/0126890 A1 * | 9/2002 | Katayama et al. | 382/154 |
| 2002/0163530 A1 * | 11/2002 | Takakura et al. | 345/629 |
| 2003/0179923 A1 * | 9/2003 | Xiong et al. | 382/154 |
| 2005/0168594 A1 | 8/2005 | Larson | |
| 2006/0050152 A1 * | 3/2006 | Rai et al. | 348/218.1 |
| 2006/0072176 A1 * | 4/2006 | Silverstein et al. | 358/540 |

FOREIGN PATENT DOCUMENTS

| | | |
|---|---|---|
| CN | 2632725 | 8/2004 |
| CN | 1589050 | 3/2005 |
| CN | 1589050 A | 3/2005 |

(Continued)

OTHER PUBLICATIONS

Szeliski et al., "Creating Full View Panoramic Image Mosaics and Environment Maps", 1997.*

(Continued)

*Primary Examiner* — Matthew Bella
*Assistant Examiner* — Jason Heidemann
(74) *Attorney, Agent, or Firm* — Staas & Halsey LLP

(57) ABSTRACT

Provided are an apparatus, method, and medium for generating a panoramic image. In the apparatus, a previously captured image and a currently captured image are projected onto a predetermined curved surface so as to form a first mapping image and a second mapping image, respectively. Movement values in predetermined directions are calculated for maximizing a color similarity between overlapped sections of the first and second mapping images. A panoramic image is generated using the first and second mapping images and the calculated movement values. Therefore, overlapped sections of neighboring images can be precisely superposed and aligned when a panoramic image is generated using a series of images.

14 Claims, 15 Drawing Sheets
(2 of 15 Drawing Sheet(s) Filed in Color)

(56) References Cited

FOREIGN PATENT DOCUMENTS

| EP | 1890481 | 7/2007 |
|---|---|---|
| JP | 11-205648 | 7/1999 |
| JP | 2000-125190 | 4/2000 |
| JP | 2000-299804 | 10/2000 |
| JP | 2002-305647 | 10/2002 |
| JP | 2004-46573 | 2/2004 |
| JP | 2004-247793 | 9/2004 |
| JP | 2004-312549 | 11/2004 |
| KR | 10-1998-0012251 | 4/1998 |
| KR | 10-2005-0120301 | 12/2005 |
| WO | 99/06943 | 2/1999 |

OTHER PUBLICATIONS

Bergen et al. "Hierarchical model-based motion estimation", May 1992, ECCV'92, pp. 237-252.*

Sawhney et al., "Robust Video Mosaicing through Topology Inference and Local to Global Alignment", 1998, ECCV '98, pp. 103-119.*

Noirfalise et al., "Real-time registration for image mosaicing," in Proc. of British Machine Vision Conference, 2002, pp. 617-625.*

Kourogi et al., "Real-time image mosaicing from a video sequence", IEEE, 1999, pp. 133-137.*

Shum et al., "Construction and refinement of panoramic mosaics with global and local alignment", 2000, IEEE, pp. 953-958.*

Sawhney et al., "True Multi-Image Alignment and Its Application to Mosaicing and Lens Distortion Correction", Mar. 1999, IEEE Transactions on Pattern Analysis and Machine Intelligence, vol. 21, No. 3, pp. 235-243.*

European Examination Report dated Mar. 16, 2010, issued in European Application No. 07116960.1.

Image Alignment and Stitching: A Tutorial, Szeliski, Microsoft Research Technical Report, Oct. 2004.

European Search Report dated May 14, 2008, issued in corresponding Patent Application 07116960.1-1224.

Spherical Mosaic Approach Using Global Automatic Brightness Correction, Published Dec. 31, 2005.

Chinese Office Action dated Jun. 28, 2010, issued in Chinese Patent Application No. 200710161932.4.

Japanese Office Action for Japanese Patent Application No. 2007-245836.

Chinese Office Action dated Dec. 21, 2011 issued in corresponding Chinese Patent Application No. 200710161932.4.

Richard Szeliski, "Image Alignment and Stitching: A Tutorial", Technical Report MSR-TR-2004-92, Dec. 2006, pp. 8-96.

Herbert Goldstein, "Classical Mechanics", Second Edition, 1980, pp. 606.

* cited by examiner (a)    (b)

APPARATUS, METHOD, AND MEDIUM FOR GENERATING PANORAMIC IMAGE USING A SERIES OF IMAGES CAPTURED IN VARIOUS DIRECTIONS

CROSS-REFERENCE TO RELATED APPLICATIONS

This application claims the priority benefit of Korean Patent Application No. 10-2006-0094127, filed on Sep. 27, 2006, in the Korean Intellectual Property Office, the disclosure of which is incorporated herein in its entirety by reference.

BACKGROUND

1. Field

Embodiments relate to an apparatus, method, and medium for generating a panoramic image, and more particularly, to an apparatus, method, and medium for generating a panoramic image by rapidly and precisely stitching a series of images captured in various directions.

2. Description of the Related Art

A panoramic image is a series of images taken in different directions and stitched in a predetermined manner. Such a panoramic image provides a wide field of view (FOV) of a scene as compared with an image captured in one direction. Thus, an extended view of a scene can be provided.

Images having overlapped sections are captured for making a panoramic image. In detail, in a series of images taken for a panoramic image, a trailing edge of an image is ideally identical with a leading edge of the previous image. A more realistic panoramic image can be obtained when the images are stitched with the overlapped sections of the images being precisely aligned.

A conventional panoramic image generating apparatus can use a series of images taken by rotating a camera 360° on a tripod so as to generate a realistic panoramic image. In detail, when generating a panoramic image by stitching a series of images, the conventional panoramic image generating apparatus moves at least one of neighboring images in a predetermined direction so as to align overlapped (ideally identical) portions of the neighboring images. Thus, the conventional apparatus can provide a realistic panoramic image. When a photographer takes a series of images in various directions by holding a camera with his/her hand and moving his/her arm along his/her intended path, a path along which the photographer's hand actually moves may not be exactly identical to the photographer's intended path. Furthermore, when the photographer pushes a photographing button with his/her finger, the camera can be undesirably shaken. Therefore, it is difficult to precisely align overlapped portions of neighboring images when generating a panoramic image by stitching a series of images using a conventional panoramic image generating apparatus.

Therefore, there is a need for a panoramic image generating apparatus and method that can be used for precisely aligning overlapped (ideally identical) sections of neighboring images even when the images are taken in different directions by moving a camera along a path that it was not intended to be moved along. In addition, there is another need for a panoramic image generating apparatus and method that can be used for generating a panoramic image with less calculation load and time. Particularly, these needs may be great when a panoramic image generating apparatus is included in a portable terminal.

SUMMARY

Embodiments provide an apparatus for generating a panoramic image by stitching a series of images by precisely aligning and superimposing overlapping sections of the images.

Embodiments provide a method of generating a panoramic image by stitching a series of images by precisely aligning and superimposing overlapping sections of the images.

Embodiments provide a computer-readable recording medium storing a computer-readable program for executing a method of generating a panoramic image by stitching a series of images by precisely aligning and superimposing overlapping sections of the images.

According to an aspect of embodiments, there is provided an apparatus for generating a panoramic image, the apparatus including: a mapping unit to map a previously captured image and a currently captured image onto a predetermined curved surface so as to form a first mapping image and a second mapping image, respectively; a calculation unit to calculate movement values in predetermined directions for maximizing a color similarity between overlapped sections of the first and second mapping images; and an image aligning unit to generate a panoramic image using the first and second mapping images and the calculated movement values.

According to another aspect of embodiments, there is provided a method of generating a panoramic image, the method including: projecting a previously captured image and a currently captured image onto a predetermined curved surface so as to form a first mapping image and a second mapping image, respectively; calculating movement values in predetermined directions for maximizing a color similarity between overlapped sections of the first and second mapping images; and generating a panoramic image using the first and second mapping images and the calculated movement values.

According to a further another aspect of embodiments, there is provided a computer-readable recording medium storing a computer-readable program for executing a method of generating a panoramic image, the method including: projecting a previously captured image and a currently captured image onto a predetermined curved surface so as to form a first mapping image and a second mapping image, respectively; calculating movement values in predetermined directions for maximizing a color similarity between overlapped sections of the first and second mapping images; and generating a panoramic image using the first and second mapping images and the calculated movement values.

According to another aspect of embodiments, there is provided at least one computer readable medium storing computer readable instructions to implement methods of embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1A:
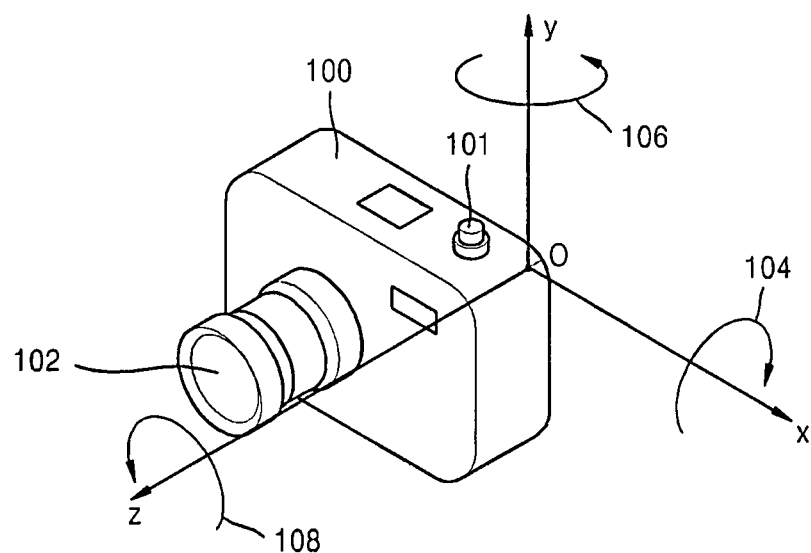
FIG. 1A is a perspective diagram illustrating a photographing device according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1A is a perspective diagram illustrating a photographing device 100 according to an exemplary embodiment. Examples of the photographing device 100 include a digital camera and other devices having a photographing function such as a portable phone. Accordingly, exemplary embodiments may include any device that can perform a photographing operation. In an exemplary embodiment, a panoramic image is generated using a plurality of images (photographs) taken with the photographing device 100.

As shown in FIG. 1A, x, y, and z-axes may be orthogonal to one another. However, the x, y, and z-axes can be set in different directions. In the configuration shown in FIG. 1A, the z-axis denotes a photographing direction. That is, the z-axis may be a direction where a shutter 102 points. The x, y, and z-axes cross at an origin (O).

Arrow 104 denotes the direction of pitching motion of the photographing device 100 around the x-axis, and arrow 106 denotes the direction of panning motion of the photographing device 100 around the y-axis. Arrow 108 denotes the direction of rolling motion of the photographing device 100 around the z-axis. Hereinafter, the term pitch angle denotes the amount of pitching motion of the photographing device 100 in the direction of arrow 104, the term panning angle denotes the amount of panning motion of the photographing device 100 in the direction of arrow 106, and the term rolling angle denotes the amount of rolling motion of the photographing device 100 in the direction of arrow 108. Furthermore, the positive directions of pitching, panning, and rolling motions of the photographing device 100 are the directions of arrows 104, 106, and 108, respectively.

Figure 1B:
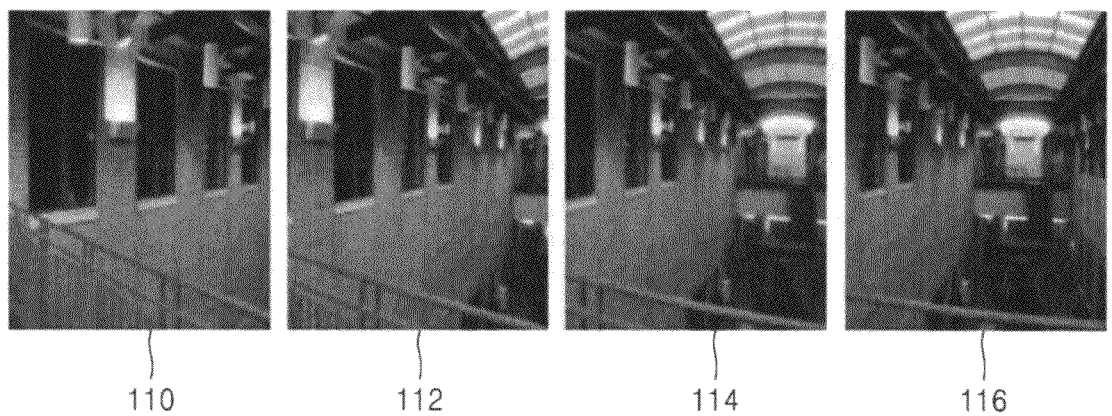
FIGS. 1B, 1C, and 1D are diagrams for explaining a single-row (horizontal) panoramic image according to an exemplary embodiment.
Figure 1C:
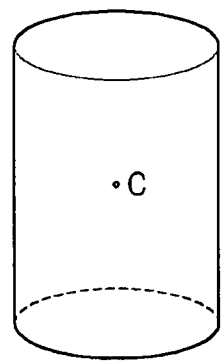
Figure 1D:
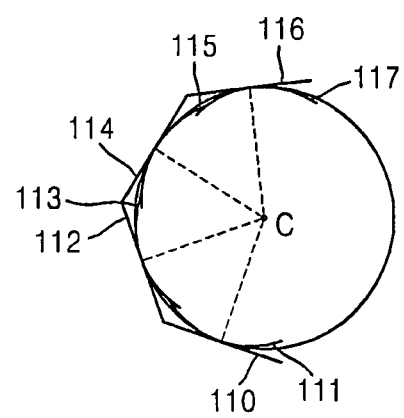
Figure 1E:
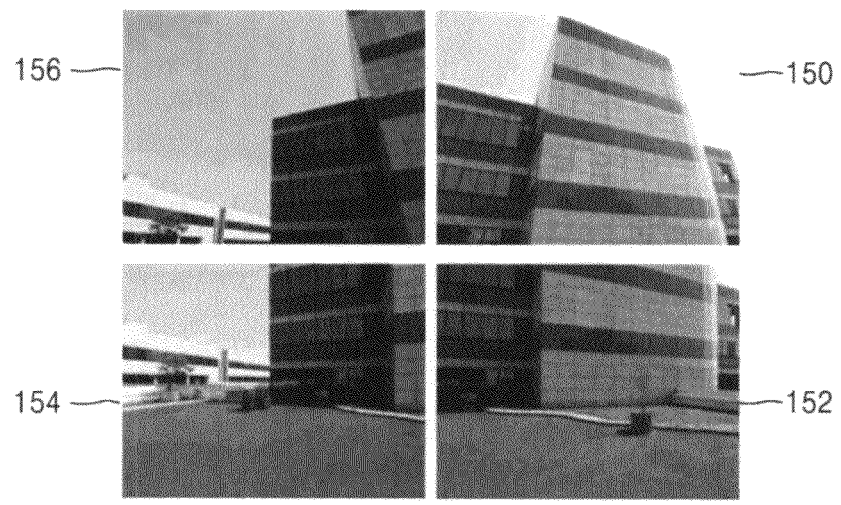
FIGS. 1E and 1F are diagrams for explaining a multi-row (spherical) panoramic image according to an exemplary embodiment.
Figure 1F:
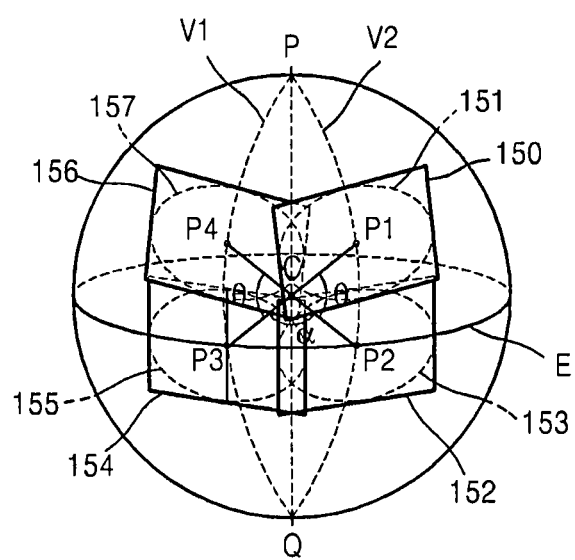

FIGS. 1B, 1C, and 1D are diagrams for explaining a single-row (horizontal) panoramic image according to an exemplary embodiment, and FIGS. 1E and 1F are diagrams for explaining a multi-row (spherical) panoramic image according to an exemplary embodiment.

A single-row (horizontal) panoramic image and a multi-row (spherical) panoramic image are examples of panoramic images that can be generated according to exemplary embodiments. In the following descriptions, the case of generating a single-row panoramic image will be described separately from the case of generating a multi-row panoramic image.

The term "single-row (horizontal) panoramic image" is used herein to denote a panoramic image made using a series of images 110, 112, 114, and 116 captured from a fixed point (C) at different horizontal angles (i.e., in different horizontal photographing directions) using the photographing device 100. For example, the photographing device 100 itself, a photographer holding the photographing device 100, or a physical part (e.g., an arm) of the photographer may rotate around the fixed point (C) to capture the images 110, 112, 114, and 116.

Referring to FIG. 1B, the images 110, 112, 114, and 116 may be an $m^{th}$ captured image (where m is a natural number), an $(m+1)^{th}$ captured image, an $(m+2)^{th}$ captured image, and an $(m+3)^{th}$ captured image, respectively. Alternatively, the images 110, 112, 114, and 116 can be an $(m+3)^{th}$ captured image, an $(m+2)^{th}$ captured image, an $(m+1)^{th}$ captured image, and an $m^{th}$ captured image, respectively. Hereinafter, reference numerals 110, 112, 114, and 116 denote first, second, third, and fourth captured images, respectively, unless they are referred to different meanings. Herein, the term "captured image" is used to denote a photograph, and the $m^{th}$ captured image denotes an $m^{th}$ image among a series of captured images.

Referring to FIG. 1C, the fixed point (C) is a center point from which a series of images are captured at different angles. For example, when the photographing device 100 is fixed to a fixture of a tripod that is rotated to capture a series of images at different angles using the photographing device 100, the tripod corresponds to the fixed point (C). When a photographer captures a series of images at different angles while moving his arm holding the photographing device 100 along a predetermined path, the photographer (specifically, a shoulder of the photographer functioning as a rotation center of the arm) corresponds to the fixed point (C).

In FIG. 1D, reference numerals 111, 113, 115, and 117 denote an $m^{th}$ projection image, an $(m+1)^{th}$ projection image, an $(m+2)^{th}$ projection image, and an $(m+3)^{th}$ projection image, respectively. Alternatively, the images 111, 113, 115, and 117 can be an $(m+3)^{th}$ projection image, an $(m+2)^{th}$ projection image, an $(m+1)^{th}$ projection image, and an $m^{th}$ projection image, respectively. Hereinafter, reference numerals 111, 113, 115, and 117 denote first, second, third, and fourth projection images, respectively, unless they are referred to different meanings. Herein, the term "mapping image" is used to denote an image formed by projecting a captured image onto a predetermined curved surface, and for example, an $m^{th}$ projection image denotes a mapping image formed by projecting the $m^{th}$ captured image on the predetermined curved surface.

The captured images 110, 112, 114, and 116 are projected onto the predetermined curved surface to form the projection images 111, 113, 115, and 117. Then, the projection images 111, 113, 115, and 117 are stitched (connected) together so as to create a single-row panoramic image. Here, the predetermined curved surface is at least a portion of a side surface of a cylinder (hereinafter, referred to as a cylindrical surface). Here, the cylinder can have a constant section as shown in FIG. 1C. However, the cylinder can have a non-constant section.

A circle shown in FIG. 1D is a cross-section of the cylinder. As shown in FIG. 1D, centers of the captured images 110, 112, 114, and 116 are placed on the circumference of the circle, and the projection images 111, 113, 115, and 117 are entirely formed on the circumference of the circle.

The term "multi-row panoramic image" is used herein to denote a panoramic image made using a series of images 150, 152, 154, and 156 captured from a fixed point (C) at different spherical angles (i.e., in different spherical photographing directions) using the photographing device 100. For example, the photographing device 100 itself, a photographer holding the photographing device 100, or a physical part (e.g., an arm) of the photographer may horizontally and vertically rotate centered on the fixed point (C) to capture the images 150, 152, 154, and 156.

Referring to FIGS. 1E and 1F, reference numerals 150 through 157 may denote an $n^{th}$ captured image, an $n^{th}$ projection image, an $(n+1)^{th}$ captured image, an $(n+1)^{th}$ projection image, an $(n+2)^{th}$ captured image, an $(n+2)^{th}$ projection image, an $(n+3)^{th}$ captured image, and an $(n+3)^{th}$ projection image, respectively. Alternatively, reference numerals 150 through 157 may denote an $(n+1)^{th}$ captured image, an $(n+1)^{th}$ projection image, an $(n+2)^{th}$ captured image, an $(n+2)^{th}$ projection image, an $(n+3)^{th}$ captured image, an $(n+3)^{th}$ projection image, an $n^{th}$ captured image, and an $n^{th}$ projection image, respectively. Alternatively, reference numerals 150 through 157 may denote an $(n+2)^{th}$ captured image, an $(n+2)^{th}$ projection image, an $(n+3)^{th}$ captured image, an $(n+3)^{th}$ projection image, an $n^{th}$ captured image, an $n^{th}$ projection image, an $(n+1)^{th}$ captured image, and an $(n+1)^{th}$ projection image, respectively. Alternatively, reference numerals 150 through 157 may denote an $(n+3)^{th}$ captured image, an $(n+3)^{th}$ projection image, an $n^{th}$ captured image, an $n^{th}$ projection image, an $(n+1)^{th}$ captured image, an $(n+1)^{th}$ projection image, an $(n+2)^{th}$ captured image, and an $(n+2)^{th}$ projection image, respectively. Hereinafter, reference numerals 150 through 157 denote a first captured image, a first projection image, a second captured image, a second projection image, a third captured image, a third projection image, a fourth captured image, and a fourth projection image, respectively, unless specifically stated otherwise.

A multi-row panoramic image is generated by projecting the captured images 150, 152, 154, and 156 onto a predetermined curved surface to form the projection images 151, 153, 155, and 157 and stitching the projection images 151, 153, 155, and 157. Here, the predetermined surface is at least a portion of a surface of the sphere (hereinafter, referred to as a spherical surface). As shown in FIG. 1F, the centers P1, P2, P3, and P4 of the captured images 150, 152, 154, and 156 are placed on the spherical surface, and the projection images 151, 153, 155, and 157 are entirely formed on the spherical.

Referring to FIG. 1F, a fixed (center) point is denoted by the letter C like in FIGS. 1C and 1D. The uppermost point (an upper pole), the lowermost point (a lower pole), and the equator of a sphere are denoted using P, Q, and E, respectively. Reference characters V1 and V2 denote longitude lines of the sphere. Reference characters P1, P2, P3, and P4 denote centers of the first captured image 150 (or the first projection image 151), the second captured image 152 (or the second projection image 153), the third captured image 154 (or the third projection image 155), and the fourth captured image 156 (or the fourth projection image 157), respectively. Reference character ($\alpha$) denotes a panning angle between the second captured image 152 (or the second projection image 153) and the third captured image 154 (or the third projection image 155). Reference character ($\theta$) denotes a pitch angle between the first and second captured images 150 and 152 (or between the third and fourth captured images 154 and 156). As shown in FIG. 1F, the centers P2, and P3 can be aligned with the equator (E), and the centers P1 and P4 can be aligned with a line parallel to the equator (E).

In the following descriptions, the captured images 110, 112, 114, and 116 of FIG. 1B will be used to explain a single-row panoramic image, and the captured images 150, 152, 154, and 156 of FIG. 1E will be used to explain a multi-row panoramic image. Although only the case when four captured images are used to form a panoramic image is explained in the following descriptions, other numbers of captured images can be used to generate a panoramic image.

Figure 2:
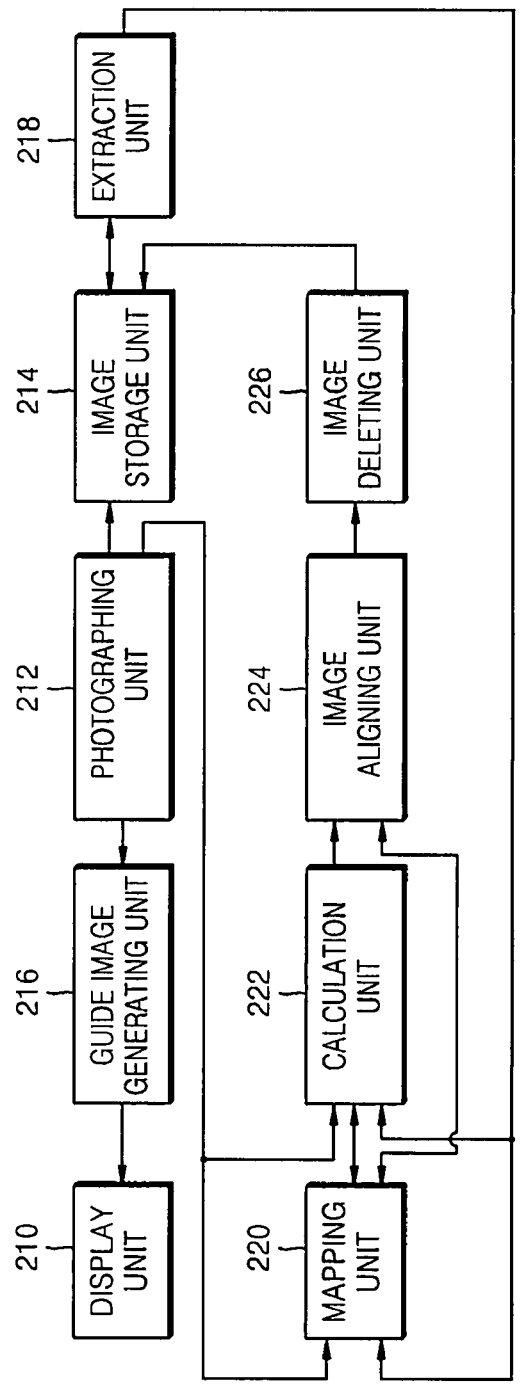
FIG. 2 is a block diagram illustrating a panoramic image generating apparatus according to an exemplary embodiment.

FIG. 2 is a block diagram illustrating a panoramic image generating apparatus according to an exemplary embodiment. The panoramic image generating apparatus may include a display unit 210, a photographing unit 212, an image storage unit 214, a guide image generating unit 216, an extraction unit 218, a mapping unit 220, a calculation unit 222, an image aligning unit 224, and an image deleting unit 226. The units 210 through 226 may be included in the photographing device 100 shown FIG. 1A.

The display unit 210 displays an image to be captured. Specifically, the display unit 210 displays an image (hereinafter, referred to as an original image) of a scene obtained through a lens (not shown).

A photographer can find a desired image from images of a scene displayed on the display unit 210. Then, the photographer can capture the desired image by manipulating a photographing button 101 (refer to FIG. 1A). The photographing button 101 may be a press button or touch button.

After that, the photographing unit 212 captures the image displayed on the display unit 210 at the moment when the photographing button 101 is manipulated, and the image storage unit 214 stores the captured image.

The guide image generating unit 216 generates a guide image using the latest image captured by the photographing unit 212 and outputs the guide image to the display unit 210. Then, the display unit 210 displays the received guide image together with a current image that can be captured. Therefore, a photographer can easily determine the photographing orientation of the photographing unit 212 using the guide image displayed on the display unit 210. In addition, when the photographing unit 212 captures an image displayed on the display unit 210, the guide image displayed on the display unit 210 together with the captured image is not further captured.

The extraction unit 218 extracts an image stored in the image storage unit 214, and the mapping unit 220 generates a mapping image by projecting the extracted image onto a predetermined curved surface. Alternatively, the mapping unit 220 can directly generate a mapping image by receiving a captured image from the photographing unit 212 and projecting the captured image onto a predetermined curved surface. As described above, the predetermined curved surface can be a cylindrical surface or spherical surface.

The mapping unit 220 generates a first mapping image and a second mapping image by projecting a previously captured image and a currently captured image onto a predetermined curved surface. The term first mapping image is used herein to denote a mapping image of a previously captured image, and the term second mapping image is used herein to denote a mapping image of a currently captured image. Furthermore, the previously captured image may be denoted by the term $p^{th}$ captured image (where p is a natural number), and the currently captured image may be denoted by the term $(p+1)^{th}$ captured image. Thus, the first mapping image and the second mapping image denote a $p^{th}$ projection image and a $(p+1)^{th}$ projection image, respectively.

The calculation unit 222 calculates movement values in predetermined directions so as to maximize the color similarity between overlapped sections of the first and second mapping images. Here, the movement value can be calculated for a captured image or a mapping image. That is, at least one of the previously captured image and the currently captured image can be shifted by the movement value, or at least one of the first and second mapping images can be shifted by the movement value. It can be determined whether the movement value is for a captured image or a mapping image, depending on the direction in which the movement value is set.

Because images captured in different directions have no overlapping section (refer to FIGS. 1C, 1D and 1F), it is favorable that the calculation unit 222 calculates proper movement value for the previously captured image and the currently captured image after projecting one of the images onto a plane including the other. Here, the image is projected regardless of the focal length of the photographing device 100, and thus the shape and area of the image are not changed by the projection.

Candidate movement values may be prepared in each predetermined direction. In this case, the calculation unit 222 shifts at least one of the previously captured image and the currently captured image (or at least one of the first and second mapping images) in each predetermined direction by a selected candidate movement value. Then, the calculation unit 222 calculates a color similarity between overlapped sections of the previously and currently captured images (or the first and second mapping images). The calculation unit 222 repeats these procedures for all the candidate movement values in each predetermined direction and determines one of the candidate movement values resulting in a maximum color similarity as a proper movement value.

In an exemplary embodiment, the maximum color similarity between overlapped sections of images is determined as follows: each time when at least one of the images moved by the candidate movement value, colors of respective pixels of the overlapped sections of the images are compared to calculate a color similarity between the overlapped sections of the images, that is, the color similarity is calculated for all pixels of the overlapped sections of the image; and the maximum of the color similarities calculated for the respective candidate movement values is selected as the maximum color similarity. Here, for example, the maximum color similarity can be determined based on the number of pixels of the overlapped sections having a color similarity higher than 90% or the mean value of the color similarities of the pixels of the overlapped sections.

For example, when a right section, having 100 pixels, of the first mapping image is overlapped with a left section, having 100 pixels, of the second mapping image, the calculation unit 222 selects a movement value from candidate movement values for each predetermined direction and moves the first and second mapping images by the selected proper movement value. Then, the calculation unit 222 calculates 100 color similarity values between the right-section 100 pixels and the left-section 100 pixels and finds a mean value of the 100 similarity values. In this way, the calculation unit 222 calculates mean values for all the candidate movement values and determines the maximum of the mean values as a proper movement value.

The calculation unit 222 can calculate the same proper movement value for the previously and currently captured images or for the first and second mapping images. Alternatively, the calculation unit 222 can calculate different proper movement values for the previously and currently captured images or for the first and second mapping images.

That is, when the photographing unit 212 captures a first image 110 or 150 and a second image 112 or 152 (refer to FIGS. 1B through 1F), the calculation unit 222 calculates proper movement values for aligning the first captured image 110 or 150 and the second captured image 112 or 152 (or for a first projection image 111 or 151 and a second projection image 113 or 153). Then, when the photographing unit 212 captures a third image 114 or 154, the calculation unit 222 calculates proper movement values for aligning the second captured image 112 or 152 and the third captured image 114 or 154 (or for aligning the second projection image 113 or 153 and a third projection image 115 or 155). Here, since the proper movement value for the second captured image 112 or 152 (or the second projection image 113 or 153) is calculated again, the previous proper movement value is replaced with the current proper movement value. In the same way, when the photographing unit 212 captures a fourth image 116 or 156, the calculation unit 222 calculates proper movement values for aligning the third captured image 114 or 154 and the fourth captured image 116 or 156 (or for aligning the third projection image 115 or 155 and a fourth projection image 117 or 157). Here, since the proper movement value for the third captured image 114 or 154 (or the third projection image 115 or 155) is calculated again, the previous proper movement value is replaced with the current proper movement value.

When the previously captured image is not the first captured image 110 or 150, the calculation unit 222 can calculate a proper movement value only for the currently captured image or the second mapping image without calculating a proper movement value for the previously captured image or the first mapping image. That is, once a proper movement value is calculated for a captured image (or a mapping image), the calculation unit 222 may not calculate a proper movement value again for the same captured image (or the same mapping image).

In this case, when the photographing unit 212 captures the first image 110 or 150 (which is the first image that has been captured for forming a current panoramic view) and the second image 112 or 152, the calculation unit 222 calculates proper movement values for aligning the first captured image 110 or 150 and the second captured image 112 or 152 (or for aligning a first projection image 111 or 151 and a second projection image 113 or 153). Then, when the photographing unit 212 captures the third image 114 or 154, the calculation unit 222 calculates a proper movement value for the third captured image 114 or 154 (or for a third projection image 115 or 155). Similarly, when the photographing unit 212 captures the fourth image 116 or 156, the calculation unit 222 calculates a proper movement value for the fourth captured image 116 or 156 (or for a fourth projection image 117 or 157).

The image aligning unit 224 respectively moves the first and second mapping images by the proper movement values. Then, the image aligning unit 224 stitches the first and second mapping images together so as to a panoramic image. In exemplary embodiments, the term "stitch" is used when images are connected or combined to generate a panoramic image.

After that, the image deleting unit 226 deletes the previously captured image stored in the image storage unit 214.

Although the image storage unit 214, the extraction unit 218, and the image deleting unit 226 are included in the panoramic image generating apparatus of FIG. 2, the image storage unit 214, the extraction unit 218, and the image deleting unit 226 may be not included in the panoramic image generating apparatus according to another exemplary embodiment.

Operations of the mapping unit 220, the calculation unit 222, and the image aligning unit 224 will now be more specifically described according to exemplary embodiments. Three exemplary embodiments below describe the operations of the mapping unit 220, the calculation unit 222, and the image aligning unit 224 in the case where a single-row panoramic image is generated, and two exemplary embodiments below describe the operations of the mapping unit 220, the calculation unit 222, and the image aligning unit 224 in the case where a multi-row panoramic image is generated.

In an exemplary embodiment, the operations of the mapping unit 220, the calculation unit 222, and the image aligning unit 224 are as follows.

The calculation unit 222 calculates proper movement values in a predetermined direction for a previously captured image and a currently captured image (or a first mapping image and a second mapping image). Here, the predetermined direction may be the direction of pitching, panning, or rolling motion of the photographing device 100 (refer to FIG. 1A). That is, the movement values can be expressed as a combination of a pitch angle, a panning angle, and a rolling angle. Hereinafter, a proper pitch angle denotes a pitch angle as a proper movement value, a proper panning angle denotes a panning angle as a proper movement value, and a proper rolling angle denotes a rolling angle as a proper movement value.

In detail, the calculation unit 222 calculates proper rolling angles and pitch angles for the previously captured image and the currently captured image. Furthermore, the calculation unit 222 calculates proper panning angles for the first and second mapping images, respectively.

Pitch angle candidates, panning angle candidates, and rolling angle candidates are prepared beforehand as movement value candidates. For example, Pitch angle candidates may be −3°, −2°, −1°, 0°, 1°, 2°, and 3°. Panning angle candidates may be −10°, −9°, . . . , 0°, . . . , 9°, and 10°. Rolling angle candidates may be −4°, −3°, −2°, −1°, 0°, 1°, 2°, 3°, and 4°.

The calculation unit 222 selects a proper rolling angle and a proper pitch angle from the candidates as follows. The calculation unit 222 projects one of the previously and currently captured images onto a plane of the other image. Then, the calculation unit 222 rotates each of the previously and currently captured images by a rolling angle and a pitch angle selected from the candidates, and calculates a color similarity value between overlapped sections of the previously and currently captured images. In this way, the calculation unit 222 calculates color similarity values between the overlapped sections for all the rolling angle candidates and the pitch angle candidates, and determines a rolling angle candidate and a pitch angle candidate that result in maximum color similarities as a proper rolling angle and a proper pitch angle.

Next, the image aligning unit 224 rotates each of the previously and currently captured images by the proper rolling angle and rotates each of the previously and currently captured images by the proper pitch angle. Then, the mapping unit 220 projects the previously and currently captured images onto a predetermined curved surface so as to form a first mapping image and a second mapping image.

Next, the calculation unit 222 rotates each of the first and second mapping images by a panning angle selected from the candidates, and calculates a color similarity value between overlapped sections of the first and second mapping images. In this way, the calculation unit 222 calculates color similarity values between the overlapped sections for all the panning candidates and determines a panning angle candidate resulting in the maximum color similarity as a proper panning angle. Then, the image aligning unit 224 rotates each of the first and second mapping angle by the proper panning angle. After that, the image aligning unit 224 stitches the first and second mapping images together to generate a panoramic image.

In another exemplary embodiment, the mapping unit 220, the calculation unit 222, and the image aligning unit 224 are operated as follows.

The calculation unit 222 calculates proper movement values in predetermined directions for a previously captured image. The proper movement values can be expressed as a combination of a proper pitch angle, a proper panning angle, and a proper rolling angle. Pitch angle candidates, panning angle candidates, and rolling angle candidates are prepared beforehand as movement value candidates in the same manner as in the previous exemplary embodiment.

The calculation unit 222 projects one of the previously captured images and a currently captured image onto a plane including the other image. Then, the calculation unit 222 selects one rolling angle candidate, one pitch angle candidate, and one panning angle candidate from the candidates. That is, the rolling, pitch, and panning angle candidates can be selected simultaneously from the candidates.

Next, the calculation unit 222 calculates a color similarity value between overlapped sections of the previously and currently captured images after rotating the previously capture image by the selected rolling angle (e.g., c), pitch angle (e.g., b), and panning angle (e.g., a).

When a pixel of the previously captured image has a coordinate (x1, y1, z1), the pixel may have a coordinate (x2, y2, z2) after being rotated by (c, b, a). Here, the xyz coordinate system used is an absolute coordinate system that is fixed regardless of the position or movement of the photographing device 100. The xyz coordinate system can be explained by Equation 1 below.

$$X2 = R*X1 \qquad \text{[Equation 1]}$$

$$X2 = \begin{matrix} x2 & 0 & 0 \\ 0 & y2 & 0 \\ 0 & 0 & z2 \end{matrix}$$

$$R = Rz, c * Ry, b * Rx, a$$

$$Rz, c = \begin{matrix} 1 & 0 & 0 \\ 0 & \cos c & -\sin c \\ 0 & \sin c & \cos c \end{matrix}$$

$$Ry, b = \begin{matrix} \cos b & 0 & -\sin b \\ 0 & 1 & 0 \\ \sin b & 0 & \cos b \end{matrix}$$

$$Rx, a = \begin{matrix} \cos a & -\sin a & 0 \\ \sin a & \cos a & 0 \\ 0 & 0 & 1 \end{matrix}$$

$$X1 = \begin{matrix} x1 & 0 & 0 \\ 0 & y1 & 0 \\ 0 & 0 & z1 \end{matrix}$$

In this way, the calculation unit 222 rotates the previously captured image three times by (Rz(c), Ry(b), Rx(a)) and then calculates a color similarity value between overlapped sections of the previously captured image and the currently captured image. However, it may take considerable time for the calculation unit 222 to calculate the color similarity value after rotating the previously capture image three times. Thus, the current exemplary embodiment provides a method of calculating a proper movement value more rapidly by reducing the number of rotations from three times to two times as follows.

Referring to Herbert Goldstein, "Classical Mechanics (2nd Edition, 1980)" (Addison-Wesley Series in Physics), page 606, three rotation angles about three axes can be expressed by three rotation angles about two axes. Therefore, three rotation angles a, b, and c about x, y, and z-axes can be converted into two rotation angles w, Y1, and Y2 about y- and z-axes.

The relationship between (a, b, c) and (w, Y1, Y2) can be expressed by Equation 2 below.

$\cos w = \cos a * \cos b$ $\sin Y1 = (\cos a * \sin b * \sin c - \sin a * \cos c)/\sin \alpha$ $\cos Y1 = (\cos a * \sin b * \cos c + \sin a * \sin c)/\sin \alpha$ $\sin Y2 = (\sin a * \cos b)/\sin \alpha$ $\cos Y2 = \sin b/\sin \alpha$ [Equation 2]

Equation 2 is obtained by Equation 3 below.

$R = Rz, c * Ry, b * Rx, a = Rz, y2 * Ry, w * Rz, y1$ [Equatioin 3]

$$Rz, y2 = \begin{matrix} \cos r2 & -\sin r2 & 0 \\ \sin r2 & \cos r2 & 0 \\ 0 & 0 & 1 \end{matrix}$$

$$Ry, w = \begin{matrix} \cos w & 0 & 0\sin w \\ 0 & 1 & 0 \\ \sin w & 0 & \cos w \end{matrix}$$

$$Rz, y1 = \begin{matrix} \cos r1 & -\sin r1 & 0 \\ \sin r1 & \cos r1 & 0 \\ 0 & 0 & 1 \end{matrix}$$

Consequently, the relationship between X2 and X1 can be expressed by Equation 4 below.

$X2 = Rz, \gamma2 * Ry, w * Rz, \gamma1 * X1$ [Equation 4]

Both sides of Equation 4 are multiplied by a matrix Rz,−γ2 to obtain Equation 5 below.

$Rz, -\gamma2 * X2 = Ry, w * Rz, \gamma1 * X1$ [Equation 5]

Thus, a color similarity between color information of a pixel of the previously captured image that is located at a position (x, y, z)=(x2, y2, z2) and color information of a pixel of the currently captured image that is located at a position (X, Y, Z)=(x2, y2, z2) is equal to a color similarity between color information of a pixel of the previously captured image that is located at a position obtained by rotating a position (X, Y, Z)=(x1, y1, z1) two times by (Ry,w*Rz,γ1) and color information of a pixel of the currently captured image that is located at a position obtained by rotating a position (X, Y, Z)=(x2, y2, z2) one time by (Rz,−γ2). Herein, a pixel of the previously captured image that is located at a position (X, Y, Z)=(x2, y2, z2) is a pixel of the previously captured image that is located at a position obtained by rotating a position (X, Y, Z)=(x1, y1, z1) three times by (Rz,γ2*Ry,w*Rz, γ1).

This allows the calculation unit 222 to calculate a proper movement value more rapidly.

In detail, the calculation unit 222 rotates the previously captured image two times by (Ry,w*Rz,γ1) and simultaneously rotates the currently captured image one time by (Rz,−γ2). Then, the calculation unit 222 can calculate a color similarity value between overlapped portions of the previously and currently captured images.

That is, when the calculation unit 222 uses Equation 1, the calculation unit 222 can calculate a color similarity value between overlapped portions of the previously and currently captured images after rotating the previously captured image three times by (Rz,c, Ry,b, Rx,a). However, when the calculation unit 222 uses Equation 5, the calculation unit 222 can calculate the color similarity value between the overlapped portions of the previously and currently captured images after rotating the previously captured two times by (Ry,w*Rz,γ1) and simultaneously rotating the currently capture image one time by (Rz, −γ2). In the latter case, when the previously captured image is rotated two times, the currently captured image is already rotated one time.

The time necessary for converting (c, b, a) into (w, Y1, Y2) is negligible as compared with the time necessary for rotating the Ry,w*Rz,γ1*X1 as much as Rz, γ2. Thus, the calculation unit 222 can calculate a proper movement value faster when using the Equation 5 than when using Equation 1.

After the calculation unit 222 calculates proper rolling angles Y1 and Y2 and a proper panning angle (w), the image aligning unit 224 rotates the previously captured image by the proper rolling angle Y1 in the rolling direction and the proper panning angle (w) in the panning direction. Then, the mapping unit 220 projects the previously captured image onto a predetermined curved surface to form a first mapping image.

For example, when the calculation unit 222 calculates a proper rolling angle Y1-1 and a proper panning angle w1 for a first captured image 110 and a proper rolling angle Y2-2 for a second captured image 112, the image aligning unit 224 rotates the first captured image 110 by the proper rolling angle Y1-1 and the proper panning angle w1. Then, the mapping unit 220 forms a first projection image 111 using the first captured image 110. Herein, when the previously captured image is an $i^{th}$ captured image (where (i) is a natural number), Y1-i denotes a proper rolling angle for the $i^{th}$ captured image, and when the currently captured image is an $i^{th}$ captured image, Y2-i denotes a proper rolling angle for the $i^{th}$ captured image.

In the same way, when the calculation unit 222 calculates a proper rolling angle Y1-2 and a proper panning angle w2 for the second captured image 112 and a proper rolling angle Y2-3 for a third captured image 114, the image aligning unit 224 rotates the second captured image 112 by the proper rolling angle Y1-2 and the proper panning angle w2. Then, the mapping unit 220 forms a second projection image 113 using the rotated second captured image 112.

Similarly, when the calculation unit 222 calculates a proper rolling angle Y1-3 and a proper panning angle w3 for the third captured image 114 and a proper rolling angle Y2-4 for a fourth captured image 116, the image aligning unit 224 rotates the third captured image 114 by the proper rolling angle Y1-3 and the proper panning angle w3 and rotates the fourth captured image 116 by the proper rolling angle Y2-4. Then, the mapping unit 220 forms third and fourth projection images 115 and 117 using the rotated first and fourth captured images 114 and 116.

After that, the image aligning unit 224 stitches the first and second projection images 111 and 113, the second and third projection images 113 and 115, and the third and fourth projection images 115 and 117, thereby generating a panoramic image.

In the previous two exemplary embodiments, the pitch direction 104 is considered in calculating a proper movement value. However, in the next exemplary embodiment, the pitch direction 104 is not considered. When a photographer manipulates the photographing button 101 of the photographing device 100 for taking an image, the trembling of the photographing device 100 in the pitch direction 104 may be negligible as compared with the trembling of the photographing device 100 in the panning direction 106 and the rolling direction 108. Thus, in the next exemplary embodiment, the pitch direction 104 is not considered.

In another exemplary embodiment, the mapping unit 220, the calculation unit 222, and the image aligning unit 224 are operated as follows.

The calculation unit 222 calculates proper movement values in a predetermined direction for a previously captured image and a currently captured image (or a first mapping image and a second mapping image). Here, the predetermined direction may be a panning direction, a rolling direction, or a vertical direction. The vertical direction is a direction parallel with the vertical center axis of a cylinder (for example, refer to FIGS. 1C and 1D). A vertical displacement (i.e., a movement value in the vertical direction) can be expressed using a length unit such as millimeters or the number of pixels. Furthermore, a proper vertical displacement denotes a proper movement value in the vertical direction.

In detail, the calculation unit 222 calculates proper rolling angles for the previously captured image and the currently captured image. Furthermore, the calculation unit 222 calculates proper panning angles and proper vertical displacements for each of the first and second mapping images.

Rolling angle candidates, panning angle candidates, and vertical displacement candidates are prepared beforehand as movement value candidates. For example, rolling angle candidates may be −4°, −3°, −2°, −1°, 0°, 1°, 2°, 3°, and 4°. Panning angle candidates may be −10°, −9°, . . . , 0°, . . . , 9°, and 10°. Vertical displacement candidates may be a negative two-pixel length, a negative one-pixel length, 0, one-pixel length, and two-pixel length.

The calculation unit 222 selects a proper rolling angle from the candidates as follows. The calculation unit 222 projects one of the previously and currently captured images onto a plane of the other image. Then, the calculation unit 222 rotates the previously and currently captured images by a rolling angle selected from the candidates, and calculates a color similarity value between overlapped sections of the previously and currently captured images. In this way, the calculation unit 222 calculates color similarity values between the overlapped sections for all the rolling angle candidates and determines a rolling angle candidate resulting in the maximum color similarity as a proper rolling angle.

Next, the image aligning unit 224 rotates each of the previously and currently captured images by the proper rolling angle. Then, the mapping unit 220 projects the previously and currently captured images onto a predetermined curved surface so as to form a first mapping image and a second mapping image.

Next, the calculation unit 222 moves each of the first and second mapping images by a panning angle and a vertical displacement selected from the candidates, and calculates a color similarity value between overlapped sections of the first and second mapping images. In this way, the calculation unit 222 calculates color similarity values between the overlapped sections for all the panning angle candidates and the vertical displacement candidates, and determines a panning angle candidate and a vertical displacement candidate that result in the maximum color similarity as a proper panning angle and a proper vertical displacement.

Then, the image aligning unit 224 moves each of the first and second mapping images by the proper panning angle and the proper vertical displacement. After that, the image aligning unit 224 stitches the first and second mapping images together to generate a panoramic image.

The current exemplary embodiment will now be described in more detail.

The calculation unit 222 calculates proper rolling angles for first and second captured image 110 and 112, and the image aligning unit 224 rotates the first and second captured images 110 and 112 by the proper rolling angles. After that, the mapping unit 220 generates first and second projection images 111 and 113 using the first and second captured images 110 and 112, and the calculation unit 222 calculates proper panning angles and proper vertical displacements for the first and second projection images 111 and 113. Then, the image aligning unit 224 rotates each of the first and second projection images 111 and 113 by the proper panning angle and moves each of the first and second projection images 111 and 113 by the proper vertical displacement.

In the same way, the calculation unit 222 may calculate proper rolling angles for the second captured image 112 and a third captured image 114 and calculate proper panning angles and proper vertical displacements for the second projection image 113 and a third projection image 115. Further, the image aligning unit 224 may rotate the second and third captured images 112 and 114 by the proper rolling angles, and then rotate and move the second and third projection images 113 and 115 by the proper panning angles and the proper vertical displacements. As just described, although a proper movement value is already calculated for the second captured image 112 (or the second projection image 113), the calculation unit 222 can calculate another proper movement value for the second captured image 112 (or the second projection image 113). In this case, the former proper movement value for the second captured image 112 (or the second projection image 113) is replaced with the latter proper movement value.

In the same way, the calculation unit 222 may calculate proper rolling angles for the third captured image 114 and a fourth captured image 116, and then calculate proper panning angles and proper vertical displacements for the third projection image 115 and a fourth projection image 117. Further, the image aligning unit 224 may rotate the third and fourth captured images 114 and 116 by the proper rolling angles, and then rotate and move the third and fourth projection images 115 and 117 by the proper panning angles and the proper vertical displacements. Although a proper movement value is already calculated for the third captured image 114 (or the third projection image 115), the calculation unit 222 can calculate another proper movement value for the third captured image 114 (or the third projection image 115). In this case, the former proper movement value for the third captured image 114 (or the third projection image 115) is replaced with the latter proper movement value.

After that, the image aligning unit 224 stitches the first and second projection images 111 and 113 together, the second and third projection images 113 and 115 together, and the third and fourth projection images 115 and 117 together, thereby generating a panoramic image.

In the current exemplary embodiment, the calculation unit 222 may not calculate a proper movement value again for a captured image (or a mapping image) once the calculation unit 222 has already calculated a proper movement value for a particular captured image (or mapping image). This case will now be described.

The calculation unit 222 calculates proper rolling angles for first and second captured image 110 and 112, and the image aligning unit 224 rotates the first and second captured images 110 and 112 by the proper rolling angles. After that, the mapping unit 220 generates first and second projection images 111 and 113 using the first and second captured images 110 and 112, and the calculation unit 222 calculates proper panning angles and proper vertical displacements for the first and second projection images 111 and 113. Next, the image aligning unit 224 rotates and moves the first and second projection images 111 and 113 by the proper panning angles and the proper vertical displacements. After that, the image aligning unit 224 stitches the first and second projection images 111 and 113 together.

Next, the calculation unit 222 calculates a proper rolling angle for a third captured image 114, and the image aligning unit 224 rotates the third captured image 114 by the proper rolling angles. After that, the mapping unit 220 generates a third projection image 115 using the third captured image 114, and the calculation unit 222 calculates a proper panning angle and a proper vertical displacement for the third projection image 115, and the image aligning unit 224 rotates and moves the third projection image 115 by the proper panning angle and the proper vertical displacement. Then, the image aligning unit 224 stitches the second and third projection images 113 and 115 together.

Thereafter, the calculation unit 222 calculates a proper rolling angle for a fourth captured image 116, and the image aligning unit 224 rotates the fourth captured image 116 by the proper rolling angle. Next, the mapping unit 220 generates a fourth projection image 117 using the fourth capture image 116, and the calculation unit 222 calculates a proper panning angle and a proper vertical displacement for the fourth projection image 117. Then, the image aligning unit 224 rotates and moves the fourth projection image 117 by the proper panning angle and the proper vertical displacement. After that, the image aligning unit 224 stitches the third and fourth projection images 115 and 117 together.

In this way, a panoramic image can be generated using the first through fourth captured images 110 through 116.

In another exemplary embodiment, the mapping unit 220, the calculation unit 222, and the image aligning unit 224 are operated as follows.

The mapping unit 220 generates first and second mapping images.

The calculation unit 222 calculates proper movement values in predetermined directions for the first and second mapping images. Here, the predetermined directions may be a pitch direction, a panning direction, and/or a rolling direction. That is, the proper movement values can be expressed as a combination of a pitch angle, a panning angle, and a rolling angle.

Pitch angle candidates, panning angle candidates, and rolling angle candidates are prepared beforehand as movement value candidates. For example, Pitch angle candidates may be −3°, −2°, −1°, 0°, 1°, 2°, and 3°. Panning angle candidates may be −10°, −9°, . . . , 0°, . . . , 9°, and 10°. Rolling angle candidates may be −4°, −3°, −2°, −1°, 0°, 1°, 2°, 3°, and 4°.

The calculation unit 222 selects a proper rolling angle from the candidates as follows. The calculation unit 222 selects one of the rolling angle candidates for each of the first and second mapping images and rotates each of the first and second mapping images by the selected rolling angle candidate. Then, the calculation unit 222 calculates a color similarity value between overlapped sections of the first and second mapping images. In this way, the calculation unit 222 calculates color similarities between the overlapped sections of the first and second mapping images for all the rolling angle candidates, and determines one of the rolling angle candidates that results in the maximum color similarity value as a proper rolling angle.

Thereafter, the image aligning unit 224 rotates each of the first and second mapping images by the proper rolling angle. In the same way, the calculation unit 222 selects a proper pitch angle from the candidates. That is, the calculation unit 222 selects one of the pitch angle candidates for each of the first and second mapping images and rotates each of the first and second mapping images by the selected pitch angle candidate. Then, the calculation unit 222 calculates a color similarity value between overlapped sections of the first and second mapping images. In this way, the calculation unit 222 calculates color similarities between the overlapped sections of the first and second mapping images for all pitch angle candidates, and determines one of the pitch angle candidates that results in the maximum color similarity value as a proper pitch angle.

Then, the image aligning unit 224 rotates each of the first and second mapping images by the proper pitch angle. In the same way, the calculation unit 222 determines a proper panning angle. That is, after rotating each of the first and second mapping image by the panning angle candidates, the calculation unit 222 determines one of the panning angle candidates that results in the maximum color similarity value between the overlapped sections of the first and second mapping images.

Thereafter, the image aligning unit 224 rotates each of the first and second mapping images by the proper panning angle and stitches the first and second mapping images together, thereby generating a panoramic image.

In other words, in the current exemplary embodiment, the mapping unit 220 generates first through fourth projection images 151 through 157, and the calculation unit 222 calculates proper movement values in predetermined directions for the first and second projection images 151 and 153. Further, the calculation unit 222 calculates proper movement values in the predetermined directions for the second and third projection images 153 and 155 and calculates proper movement values in the predetermined directions for the third and fourth projection images 155 and 157. Here, when a proper movement value is calculated again for the second projection image 153, the former proper movement value for the second projection image 153 is replaced with the latter proper movement value. Further, when the proper movement value is calculated again for the third projection image 155, the former proper movement value for the third projection image 155 is replaced with the latter proper movement value. In addition, the image aligning unit 224 stitches the first and second projection images 151 and 153 together, the second and third projection images 153 and 155 together, and the third and fourth projection images 155 and 157 together, thereby creating a panoramic image.

As described above, according to the current exemplary embodiment, since the movement values are spherical movement (rotation) values (in a spherical coordinate system), it may take considerable time for calculating a proper movement value. Thus, the following exemplary embodiment provides a method of calculating a proper movement value with less time and calculation load in creating a panoramic image.

In another exemplary embodiment, the mapping unit 220, the calculation unit 222, and the image aligning unit 224 are operated as follows.

The mapping unit 220 generates first and second partial images (not shown) by projecting first and second captured images 150 and 152 onto a first predetermined cylindrical surface. Here, the first predetermined cylindrical surface is a lateral surface of a first predetermined cylinder, and the first predetermined cylinder is a cylinder having a longitudinal axis that is parallel with an axis (P-Q line) of a sphere (refer to FIGS. 1C, 1D and 1F). Further, the center P1 of the first captured image 150 may be located on one of lines perpendicular both to the longitudinal axis of the first predetermined cylinder and to the P-Q axis of the sphere, and the center P2 of the second captured image 152 may be located on another of the perpendicular lines. Herein, an $r^{th}$ partial image (where r is a natural number) is a kind of mapping image.

In the same way, the mapping unit 220 generates third and fourth partial images (not shown) by projecting third and fourth captured images 154 and 156 onto a second predetermined cylindrical surface. Here, the second predetermined cylindrical surface is a lateral surface of a second predetermined cylinder, and the second predetermined cylinder is a cylinder having a longitudinal axis that is parallel with the P-Q axis of the sphere. Further, the center P3 of the third captured image 154 may be located on one of lines perpendicular both to the longitudinal axis of the second predetermined cylinder and to the P-Q axis of the sphere, and the center P4 of the fourth captured image 156 may be located on another of the perpendicular lines.

The calculation unit 222 calculates proper movement values in a predetermined direction for the first and second partial images. The calculated proper movement values are used as first adjustment values for moving the first and second partial images on the first predetermined cylindrical surface in the predetermined direction. Here, the predetermined direction may be a panning direction or a vertical direction. Similarly, the calculation unit 222 calculates proper movement values in a predetermined direction for the third and fourth partial images. The calculated proper movement values are used as second adjustment values for moving the third and fourth partial images on the second predetermined cylindrical surface in the predetermined direction. Here, the predetermined direction may be a panning direction or a vertical direction.

The image aligning unit 224 moves the first and second partial images by the first adjustment values and stitches the first and second partial images together so as to create a first stitched image (not shown). Similarly, the image aligning unit 224 moves the third and fourth partial images by the second adjustment values and stitches the third and fourth partial images together so as to create a second stitched image (not shown).

After that, the mapping unit 220 generates a fifth partial image (not shown) by projecting the first stitched image onto a first adjustment plane. Here, the first adjustment plane may be a plane perpendicular to a C-P2 line of the sphere and on which the center P2 of the second captured image 152 is located. Similarly, the mapping unit 220 generates a sixth partial image (not shown) by projecting the second stitched image onto a second adjustment plane. Here, the second adjustment plane may be a plane perpendicular to a C-P3 line of the sphere and on which the center P3 of the third captured image 154 is located. Unlike usual mapping images (e.g., the first to fourth partial images just described, and seventh and eighth partial images to be described below), the fifth and sixth partial images are formed on a plane.

The mapping unit 220 generates the seventh and eighth partial images (not shown) by projecting the fifth and sixth partial images onto a third predetermined cylindrical surface. Here, the third predetermined cylindrical surface is a lateral surface of a third predetermined cylinder, and the third predetermined cylinder is a cylinder having a longitudinal axis parallel with the tangent line of the equator of the sphere.

Thereafter, the calculation unit 222 calculates proper movement values in a predetermined direction for the seventh and eighth partial images. The calculated proper movement values are used as third adjustment values for shifting the seventh and eighth images on the third predetermined cylindrical surface in the predetermined direction. Here, the predetermined direction may be a panning direction or a vertical direction.

The image aligning unit 224 moves the seventh and eighth partial images by the third adjustment values and stitches the seventh and eighth partial images together so as to create a panoramic image (not shown).

In the current exemplary embodiment, as explained above, the proper movement values are calculated with respect to a cylindrical surface instead of a spherical surface. Therefore, according to the current exemplary embodiment, a panoramic image can be generated more rapidly than in the previous exemplary embodiment.

FIGS. 3A through 3D are diagrams for explaining operations of the display unit 210, the photographing unit 212, and the guide image generating unit 216 of the panoramic image generating apparatus of FIG. 2, according to an exemplary embodiment. The display unit 210 includes a liquid crystal display 310.

Figure 3A:
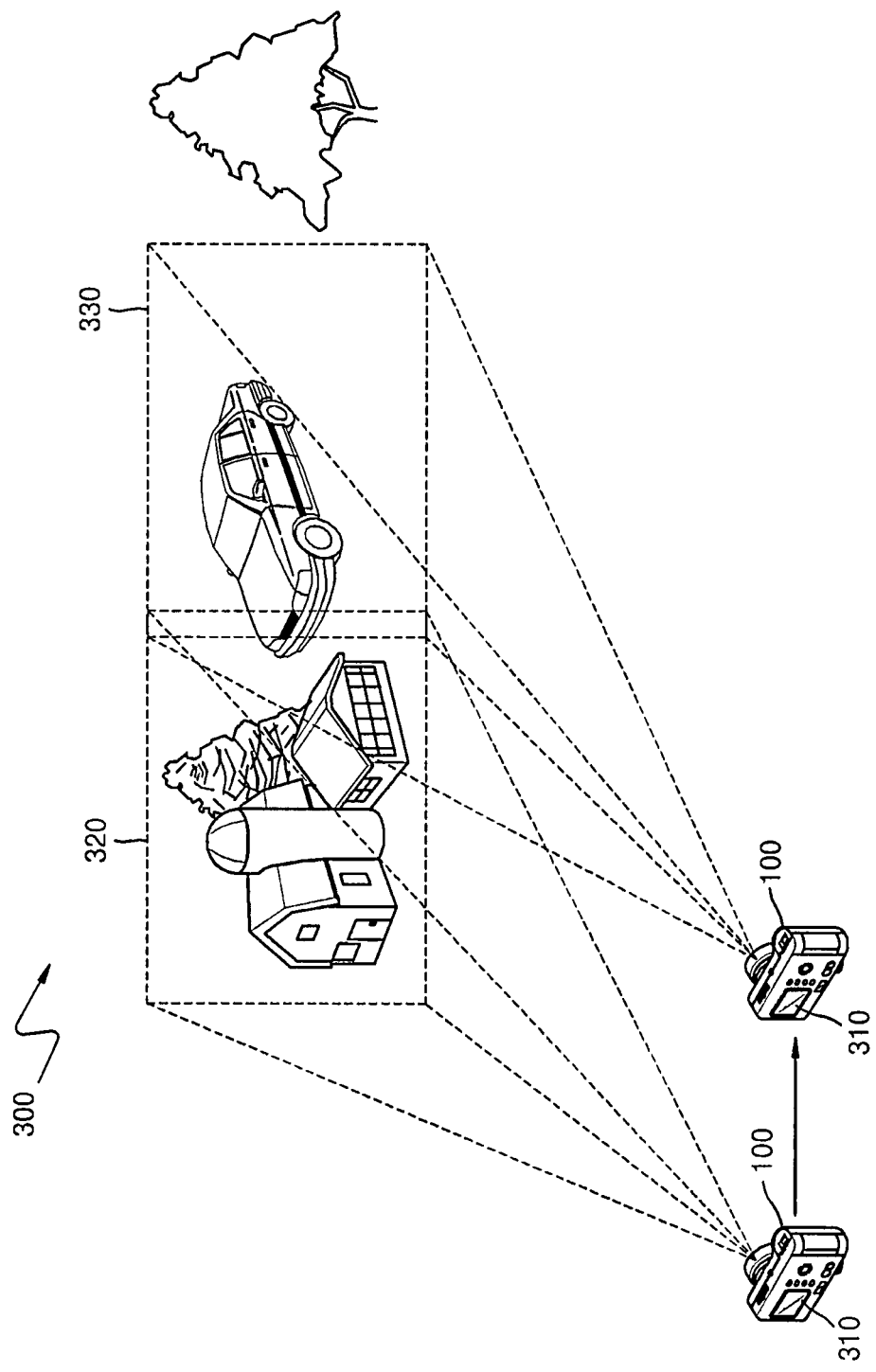
FIGS. 3A through 3E are diagrams for explaining operations of a display unit, a photographing unit, and a guide image generating unit of the panoramic image generating apparatus of FIG. 2, according to an exemplary embodiment.

FIG. 3A shows original images 300 (a previously captured image 320 and a currently captured image 330) displayed on the liquid crystal display 310.

Figure 3B:
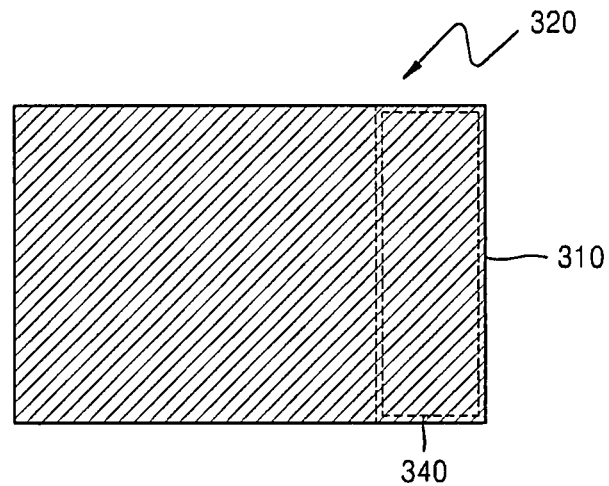

FIG. 3B is a diagram for explaining an operation of the guide image generating unit 216 according to an exemplary embodiment.

The guide image generating unit 216 generates a guide image using the previously captured image 320.

Specifically, the guide image generating unit 216 generates a guide image by selecting a predetermined section 340 from the previously captured image 320 and removing the other section from the previously captured image 320. Here, the size of the predetermined section 340 may be predetermined.

The location of the predetermined section 340 in the previously captured image 320 may be determined based on the moving direction of the photographing device 100 (in other words, based on a change in the photographing orientation of the photographing device 100). For example, when the photographing device 100 moves from left to right after the photographing unit 212 captures the image 320 as shown in FIG. 3A, the guide image generating unit 216 selects a right section (predetermined section 340) having a predetermined size from the previously captured image 320 and removes the other section from the previously captured image 320 so as to form a guide image. Similarly, for example, when the photographing device 100 moves upward after the photographing unit 212 captures the image 320 unlike in FIG. 3A, the guide image generating unit 216 selects an upper section (predetermined section 340) having a predetermined size from the previously captured image 320 and removes the other section from the previously captured image 320 so as to form a guide image.

Alternatively, the location of the predetermined section 340 in the previously captured image 320 can be determined regardless of the moving direction of the photographing device 100 (in other words, regardless of a change in the photographing direction of the photographing device 100).

In detail, when the photographing device 100 operates in single-row mode for generating a single-row (horizontal) panoramic image, the guide image generating unit 216 generates a guide image by selecting a predetermined section 340 (e.g., a right section) having a predetermined size from the previously captured image 320 and removing the other section from the previously captured image 320. That is, in this case, a photographer is requested to photograph a plurality of images while moving the photographing device 100 to the right.

On the other hand, in multi-row mode of the photographing device 100 for generating a multi-row (spherical) panoramic image, the location of a predetermined section 340 in a captured image can vary in a predetermined manner each time the guide image generating unit 216 generates a guide image. For example, the guide image generating unit 216 can select a lower section, a right section, and an upper section from a series of captured images, respectively, as predetermined sections 340 for generating guide images. In this case, the guide image generating unit 216 generates a first guide image by selecting a lower section having a predetermined size from a first captured image 150 and removing the other section from the first captured image 150. Similarly, the guide image generating unit 216 generates a second guide image by selecting a right section having a predetermined size from a second captured image 152 and removing the other section from the second captured image 15. Further, the guide image generating unit 216 generates a third guide image by selecting a upper section having a predetermined size from a third captured image 154 and removing the other section from the third captured image 154.

Figure 3C:
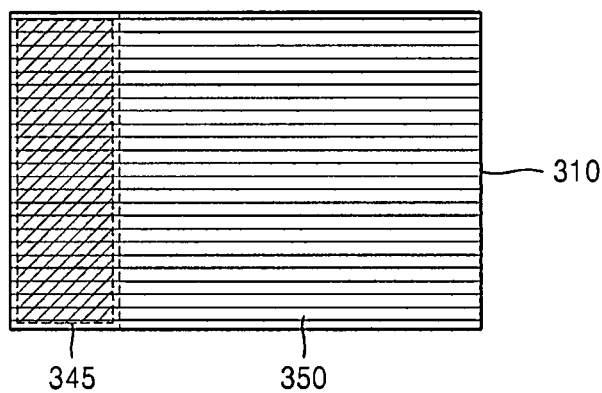
Figure 3D:
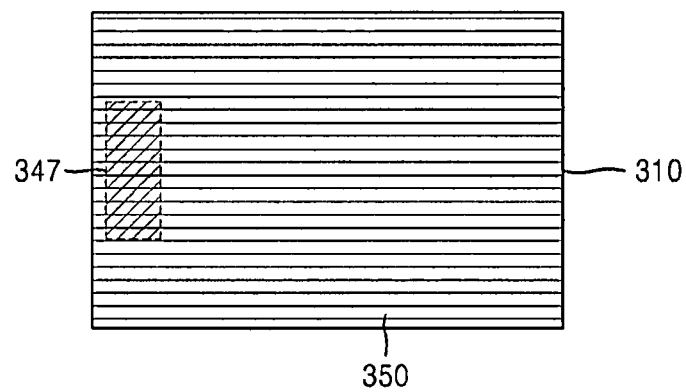
Figure 3E:
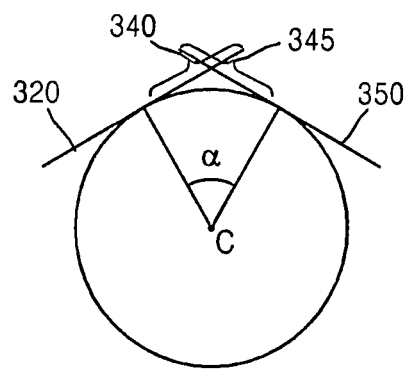

FIGS. 3C and 3D are diagrams for explaining an operation of the display unit 210 that displays a preview image together with a guide image according to an exemplary embodiment.

Referring to FIGS. 3C and 3D, the display unit 210 displays a guide image in a first predetermined region 345 (or 347) of the liquid crystal display 310 and a preview image captured through a lens (not shown) in a second predetermined region 350 of the liquid crystal display 310. Here, for example, the first predetermined region 345 is overlapped with the second predetermined region 350, or the first predetermined region 347 is included in the second predetermined region 350. Here, the preview image captured through the lens is an image to be captured as the currently captured image 330.

Referring to FIG. 3C, when the first predetermined region 345 is overlapped with a portion of the second predetermined region 350, the first predetermined region 345 and the predetermined section 340 (refer to FIG. 3B) of the previously captured image 320 may have the same size, and the location of the first predetermined region 345 in the liquid crystal display 310 may correspond to the location of the predetermined section 340. For example, when the predetermined section 340 is located on a right section (having a predetermined size) of the previously captured image 320 as shown in FIG. 3B, the first predetermined region 345 may be located on a left section of the liquid crystal display 310, and the left section of the liquid crystal display 310 may have the same size as the right section of the previously captured image 320 as shown in FIG. 3C. In other words, the location of the predetermined region 345 on the liquid crystal display 310 may be determined based on a change in the photographing direction of the photographing device 100. For example, when the photographing device 100 moves to the right after the photographing unit 212 takes an image as shown in FIG. 3A, the display unit 210 displays a guide image in a left region (having a predetermined size) of the liquid crystal display 310. Alternatively, the location of the predetermined region 345 on the liquid crystal display 310 may be determined regardless of a change in the photographing direction of the photographing device 100. For example, when the photographing device 100 operates in single-row mode for generating a single-row panoramic image, the display unit 210 displays a guide image in a left region (having a predetermined size) of the liquid crystal display 310.

Referring again to FIG. 3C, the display unit 210 can displays guide and preview images at brightness levels lower than original brightness levels of the guide and preview images.

Referring to FIG. 3D, when the first predetermined region 347 is included in the second predetermined region 350, the size of the first predetermined region 347 is smaller than that of the predetermined section 340 of the previously captured image 320. That is, the display unit 210 displays only a portion of the guide image. For this, the display unit 210 projects pixels of the guide image onto a conversion plane. Here, the conversion plane is a plane on which an image (the currently captured image 330) is expected to be formed. For example, in the case where a photographer intends to change a photographing direction of the photographing device 100 by a panning angle (q) (where, for example, q is a natural number) for capturing the next image after capturing an image when the photographer takes a plurality of images 110, 112, 114, and 116 for creating a single-row panoramic image, the conversion plane is a plane of the previously captured image that is rotated by the panning angle (q). In this case, when a pixel of the previously captured image originally has an XY coordinate (u1, v1), the XY coordinate of the pixel changes to (u2, v2) on the conversion plane. The relationship between (u1, v1) and (u2, v2) is given by Equation 6 below.

$$u2 = \frac{u1 - f * \tan q}{f + u1 * \tan q} * f$$

$$v2 = \frac{\sqrt{u2^2 + f^2}}{\sqrt{u1^2 + f^2}} * v1 = \frac{f * v1}{u1 * \sin q + f * \cos q}$$

[Equation 6]

where f denotes the focal length of the photographing device 100.

The display unit 210 calculates the coordinate (u2, v2) using Equation 6 and determines where the calculated coordinate (u2, v2) is included in the first predetermined region 347. If the calculated coordinate (u2, v2) is not included in the first predetermined region 347, the display unit 210 does not display the pixel corresponding to the coordinate (u2, v2). If the calculated coordinate (u2, v2) is included in the first predetermined region 347, the display unit 210 displays the pixel corresponding to the coordinate (u2, v2).

In this way, the location of the first predetermined region 345 on the liquid crystal display 310 is determined based on a change in the photographing direction of the photographing device 100, or the first predetermined region 347 is located within the second predetermined region 350. In this case, a plurality of images 150, 152, 154, and 156 (shown on FIG. 1E) may be captured for creating a multi-row panoramic image as follows.

The display unit 210 displays a guide image together with a preview image that is currently capturable, in consideration of the positional relationship between a previously captured image and the preview image (a current image to be captured). Therefore, when the positional relationship is complex, it is difficult for the display unit 210 to rapidly display the guide image.

The image 152 can be captured after changing the position of the photographing device 100 in one direction (i.e., a pitch direction) from a position for the image 150. Similarly, the image 154 can be captured after changing the position of the photographing device 100 in one direction (i.e., a panning direction) from the position for the image 152, and the image 156 can be captured after changing the position of the photographing device 100 in one direction (i.e., a pitch direction) from the position for the image 154. However, the image 156 (or the image 150) can be captured after changing position of the photographing device 100 in two directions (i.e., the panning and pitch directions) from the position for the image 150 (or the image 156). It is apparent to those of skill in the related art that the display unit 210 can display a guide image more rapidly when only one direction is involved than when two directions are involved.

That is, the display unit 210 can display a guide image more rapidly when the images 150 and 152, the images 152 and 154, or the images 154 and 156 are a previously captured image and a currently captured image, rather than when the images 156 and 150 are the previously and currently captured images.

For the same reason, the display unit 210 can display a guide image more rapidly when the images 156 and 154, the images 154 and 152, or the images 152 and 150 are a previously captured image and a currently captured image, rather than when the images 150 and 156 are the previously and currently captured images.

That is, the images 150, 152, 154, and 156 may be $n^{th}$, $(n+1)^{th}$, $(n+2)^{th}$, and $(n+3)^{th}$ captured images, respectively, or $(n+3)^{th}$, $(n+2)^{th}$, $(n+1)^{th}$, and $n^{th}$ captured images, respectively, rather than the images 150, 152, 154, and 156 being $(n+1)^{th}$, $(n+2)^{th}$, $(n+3)^{th}$, and $n^{th}$ captured images, respectively, or $(n+2)^{th}$, $(n+3)^{th}$, $n^{th}$, and $(n+1)^{th}$ captured images, respectively.

Figure 4:
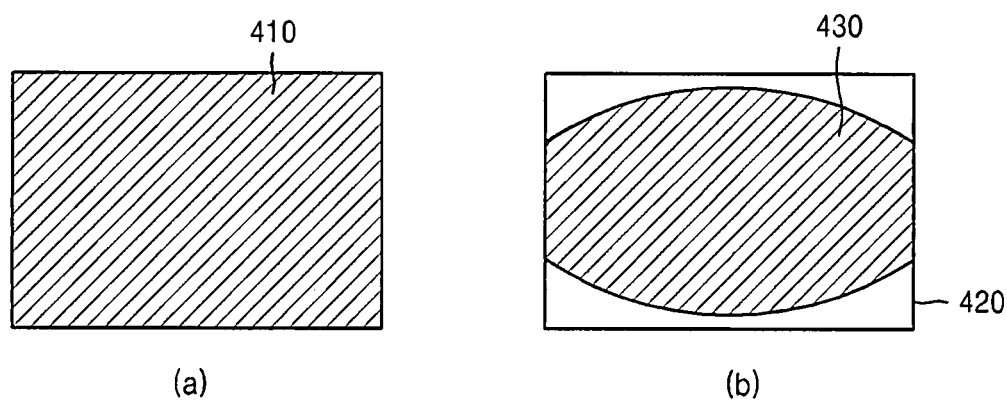
FIG. 4 is a reference diagram for explaining an operation of a mapping unit of the panoramic image generating apparatus of FIG. 2, according to an exemplary embodiment.

FIG. 4 is a reference diagram for explaining an operation of the mapping unit 220 of the panoramic image generating apparatus of FIG. 2, according to an exemplary embodiment.

The mapping unit 220 generates a mapping image 430 by projecting a captured image 410 on a predetermined curved surface (e.g., a cylindrical surface or a spherical surface). Here, the mapping unit 220 projects the captured image 410 in consideration of the focal length of the photographing device 100. Therefore, although the captured image 410 is rectangular, the mapping image 430 may have an elliptical shape with tapered ends.

The mapping unit 220 can also generate a mapping image by projecting an image from a curved surface onto a flat plane. The above-described fifth and sixth partial images are examples of such mapping images.

Figure 5:
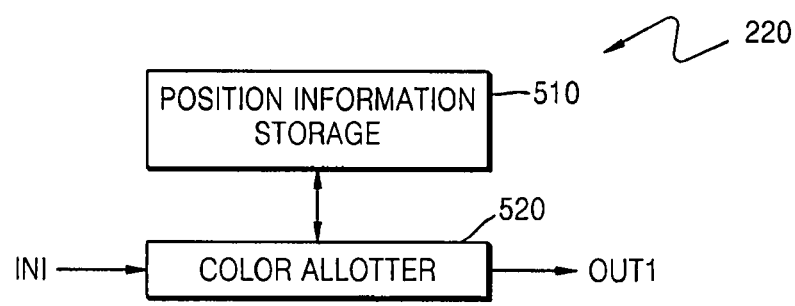
FIG. 5 is a block diagram for explaining the mapping unit of the panoramic image generating apparatus of FIG. 2, according to an exemplary embodiment.

FIG. 5 is a block diagram for explaining the mapping unit 220 of the panoramic image generating apparatus of FIG. 2, according to an exemplary embodiment. The mapping unit 220 can include a position information storage 510 and a color allotter 520.

As explained above, the mapping image 430 can be generated by calculation using the captured image 410 and the focal length of the photographing device 100. When the calculation is performed for all pixels of the captured image 410, the mapping unit 220 may be heavily loaded.

To prevent this problem, the positions of all pixels of the captured image 410 can be matched beforehand to positions of corresponding pixels of the mapping image 430 to be formed on a projection curved surface 420. In this case, the mapping unit 220 can automatically generate a mapping image 111, 113, 115, or 117 without the above-described calculation by assigning color values of pixels of a captured image 110, 112, 114, or 116 to the positions of the projection curved surface 420 that are matched to the positions of the pixels of the captured images 110, 112, 114, or 116. Here, the predetermined curved surface 420 may be a portion of a predetermined curved surface (e.g., a cylindrical surface), and the size of the projection curved surface 420 may be the same as that of the captured image 410.

In detail, the position information storage 510 stores information about the positions of the pixels of the captured image 410 and the positions of the pixels of the mapping image 430 on the projection curved surface 420 that are matched to the positions of the pixels of the captured image 410.

The color information allotter 520 receives information about the position of pixels of a captured image 110, 112, 114, or 116 from the photographing unit 212 or the extraction unit 218 through an input terminal IN1. Next, the color information allotter 520 reads information about positions matched to the positions of the pixels of the captured image 110, 112, 114, or 116 from the color information storage 510. Then, the color information allotter 520 assigns color values of the pixels of the captured image 110, 112, 114, or 116 to the read positions. The color information allotter 520 assigns color values of all the pixels of the captured image 110, 112, 114, or 116 to the read positions so as to generate a mapping image 111, 113, 115, or 117. After that, the color information allotter 520 outputs the mapping image 111, 113, 115, or 117 to the calculation unit 222 or the image aligning unit 224 through an output terminal OUT1.

Figure 6:
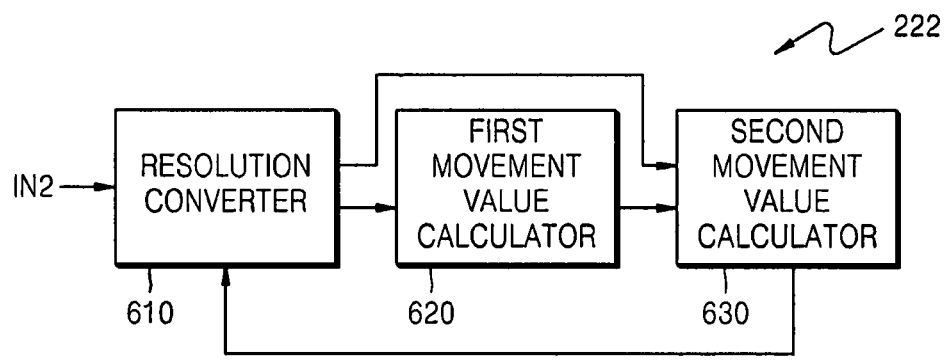
FIG. 6 is a block diagram for explaining a calculation unit of the panoramic image generating apparatus of FIG. 2, according to an exemplary embodiment.

FIG. 6 is a block diagram for explaining an operation of the calculation unit 222 of the panoramic image generating apparatus of FIG. 2, according to an exemplary embodiment. The operation of the calculation unit 222 according to the current exemplary embodiment relates to the above-described exemplary embodiment in which the motion of the photographing device 100 in a pitch direction 104 is not considered. The calculation unit 222 can include a resolution converter 610, a first movement value calculator 620, and a second movement value calculator 630.

The resolution converter 610 may receive a captured image from the photographing unit 212 or the extraction unit 218 through an input terminal IN2, or a mapping image from the mapping unit 220 through the input terminal IN2. The resolution of the captured image or the mapping image received through the input terminal IN2 will now be denoted by a $K^{th}$ resolution, where K is an integer larger than one.

The resolution converter 610 processes the received captured image, or the mapping image, so as to reduce the resolution of the captured image from $K^{th}$ resolution to a $k^{th}$ resolution, where k is a natural number smaller than K (as such $k^{th}$ resolution<$(k+1)^{th}$ resolution).

The first movement value calculator 620 calculates proper rolling angles (e.g., −3°) for a previously captured image and a currently captured image that have a $k^{th}$ resolution. The second movement value calculator 630 calculates proper panning angles (e.g., 8°) and proper vertical displacements (e.g., one-pixel length) for first and second mapping images having a $k^{th}$ resolution.

After that, the resolution converter 610 processes the first and second mapping images so as to increase the resolution of the first and second mapping images from $k^{th}$ resolution to $(k+1)^{th}$ resolution, and the second movement value calculator 630 recalculates proper panning angles and proper vertical displacements for the first and second mapping images. Here, the previously calculated proper panning angles (e.g., 8°) and proper vertical displacements (e.g., one-pixel length) can be considered. For example, the second movement value calculator 630 can select one of 7.6°, 7.8°, 8°, 8.2°, and 8.4° and one of a 0.8-pixel length, a 1-pixel length, and a 1.2-pixel length as a proper panning angle and a proper vertical displacement for each of the first and second mapping images having the $(k+1)^{th}$ resolution. In this case, the number of possible combinations is 5*3=15. Thus, the second movement value calculator determines a proper combination of a panning angle (e.g., 8.2°) and a vertical displacement (e.g., 0.8-pixel length) for each of the first and second mapping images having the $(k+1)^{th}$ resolution from the fifteen possible combinations. Then, the previously calculated proper panning angle (e.g., 8°) and vertical displacement (e.g., 1-pixel length) are replaced with the currently calculated proper panning angle (e.g., 8.2°) and vertical displacement (0.8-pixel length).

When the $(k+1)^{th}$ resolution is not equal to the $K^{th}$ resolution, the first and second movement value calculators 620 and 630 can calculate proper panning angles and proper vertical displacements in the same way as described above. That is, when the $(k+1)^{th}$ resolution is not equal to the $K^{th}$ resolution, the resolution converter 610 processes the first and second mapping images so as to increase the resolution of the first and second mapping images from $(k+1)^{th}$ resolution to $(k+2)^{th}$ resolution, and the second movement value calculator 630 recalculates proper panning angles and proper vertical displacements for the first and second mapping images having the $(k+2)^{th}$ resolution. Here, the previously calculated proper panning angles (e.g., 8.2°) and vertical displacements (e.g., 0.8-pixel length) can be considered.

Figure 7:
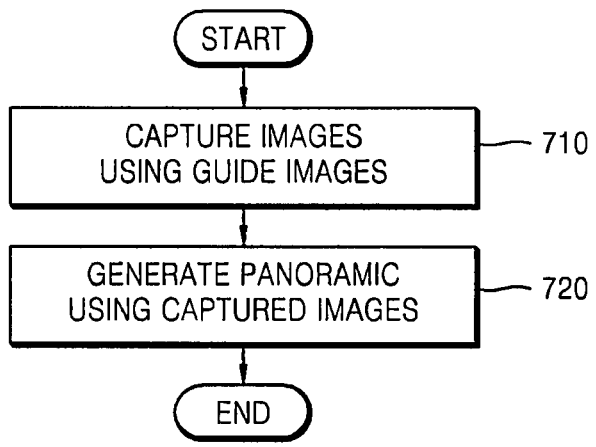
FIG. 7 is a flowchart for explaining a method of generating a panoramic image according to an exemplary embodiment.

FIG. 7 is a flowchart for explaining a method of generating a panoramic image according to an exemplary embodiment. The method may include operations 710 and 720 for capturing a plurality of images using guide images and generating a panoramic image using the captured images.

In operation 710, the guide image generating unit 216 generates a guide image using a previously captured image, and the display unit 210 displays the guide image together with a preview image that can be currently captured. Then, a photographer can capture a desired image using the preview image and the guide image by manipulating the photographing button 101.

In operation 720, the mapping unit 220 generates first and second mapping images using the previously and currently captured images, and the calculation unit 222 calculates proper movement values for the first and second mapping images. The image aligning unit 224 moves the first and second mapping images by the proper movement values and then stitches the first and second mapping images so as to create a panoramic image.

Figure 8:
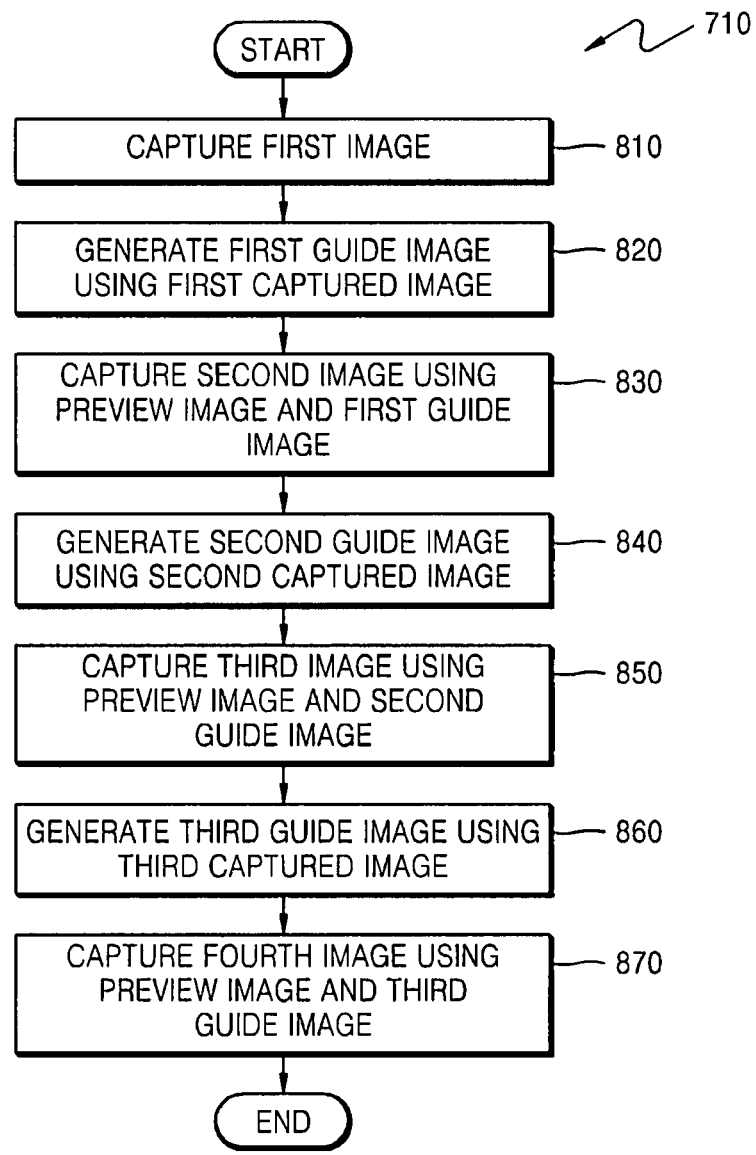
FIG. 8 is a flowchart for explaining, in more detail, operation 710 of the method of FIG. 7, according to an exemplary embodiment.

FIG. 8 is a flowchart for explaining, in more detail, operation 710 of the method of FIG. 7, according to an exemplary embodiment. Operation 710 may include operations 810 through 870 for generating a guide image using a previously captured image.

In operation 810, the photographing unit 212 captures a first image 110 or 150 (first captured image).

In operation 820, the guide image generating unit 216 generates a first guide image using the first captured image 110 or 150. Herein, an $s^{th}$ guide image is a guide image generated using an $s^{th}$ captured image, where s is a natural number.

In operation 830, the liquid crystal display 310 displays the first guide image together with a preview image, and the photographing unit 212 captures a second image (second captured image) when the photographing button 101 is manipulated.

In operation 840, the guide image generating unit 216 generates a second guide image using the second captured image captured.

In operation 850, the liquid crystal display 310 displays the second guide image together with a preview image, and the photographing unit 212 captures a third image (third captured image) when the photographing button 101 is manipulated.

In operation 860, the guide image generating unit 216 generates a third guide image using the third captured image captured.

In operation 870, the liquid crystal display 310 displays the third guide image together with a preview image, and the photographing unit 212 captures a fourth image (fourth captured image) when the photographing button 101 is manipulated.

Figure 9A:
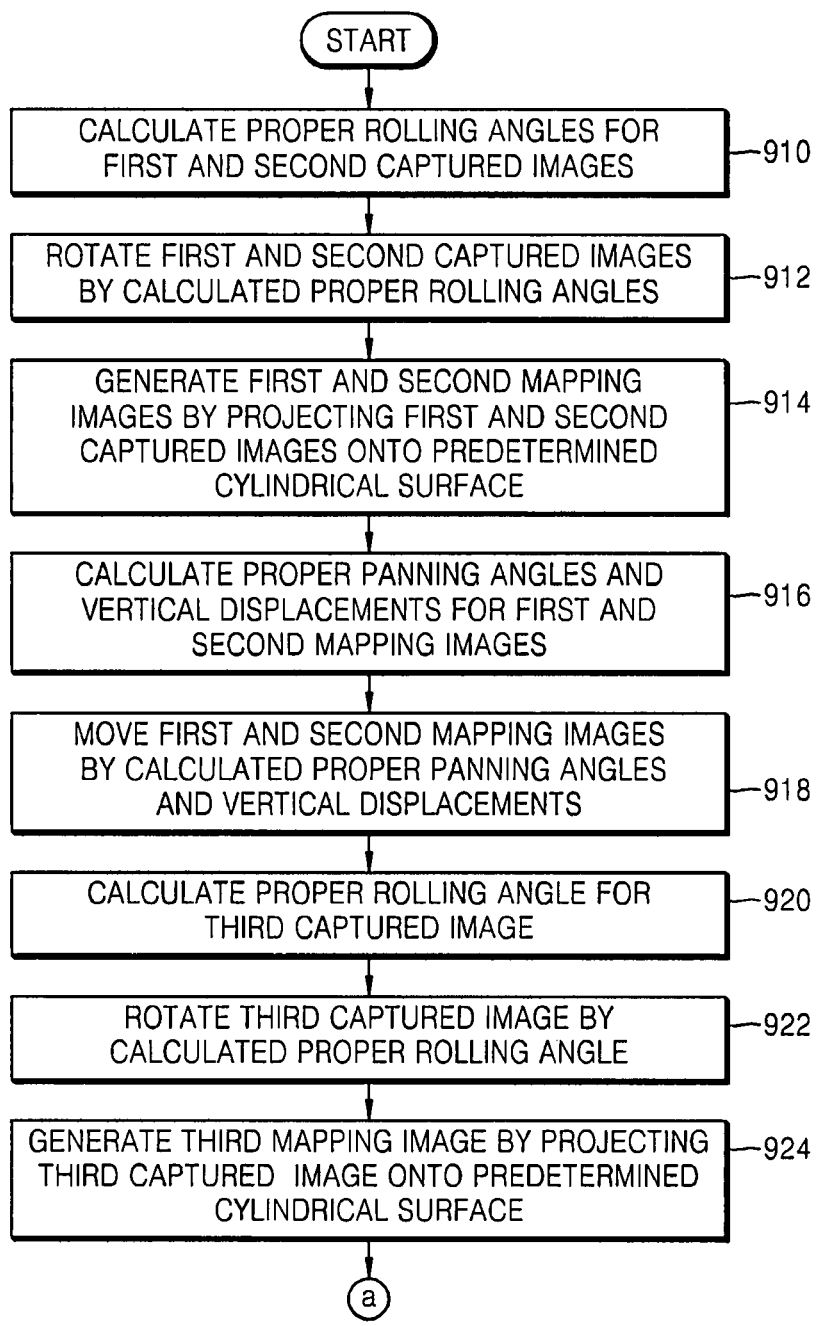
FIGS. 9A and 9B are a flowcharts for explaining, in more detail, operation 720 of the method of FIG. 7 when a single-row panoramic image is generated according to an exemplary embodiment.
Figure 9B:
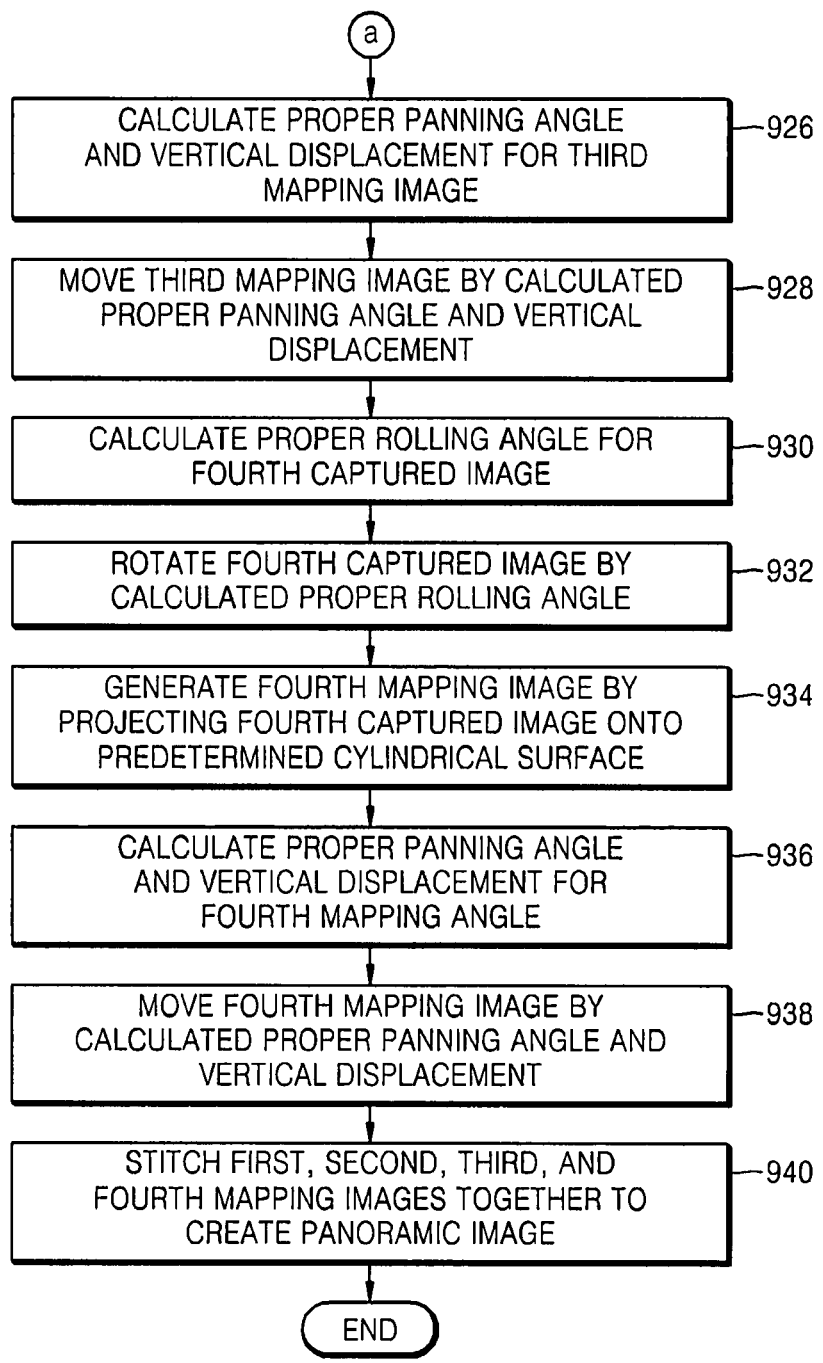

FIGS. 9A and 9B are flowcharts for explaining, in more detail, operation 720 of the method illustrated with reference to FIG. 7 when a single-row (horizontal) panoramic image is generated according to an exemplary embodiment. Operation 720 may include operations 910 through 940 for generating a single-row panoramic image using first, second, third, and fourth captured images 110, 112, 114, and 116. In the current exemplary embodiment, the pitching motion (pitch angle) of the photographing device 100 is not considered for clarity.

In operation 910, the calculation unit 222 calculates proper rolling angles for the first and second captured images 110 and 112. In operation 912, the image aligning unit 224 rotates the first and second captured images 110 and 112 by the proper rolling angles calculated in operation 910.

In operation 914, the mapping unit 220 projects the first and second captured images 110 and 112 onto a predetermined cylindrical surface so as to form first and second projection images 111 and 113.

In operation 916, the calculation unit 222 calculates proper panning angles and proper vertical displacements for the first and second projection images 111 and 113. In operation 918, the image aligning unit 224 moves the first and second projection images 111 and 113 by the calculated proper panning angles and vertical displacements.

In operation 920, the calculation unit 222 calculates a proper rolling angle for the third captured image 114. In operation 922, the image aligning unit 224 rotates the third captured image 114 by the proper rolling angle calculated in operation 920.

In operation 924, the mapping unit 220 projects the third captured image onto the predetermined cylindrical surface so as to form a third projection image 115.

In operation 926, the calculation unit 222 calculates a proper panning angle and a proper vertical displacement for the third projection image 115. In operation 928, the image aligning unit 224 moves the third projection image 115 by the calculated proper panning angle and vertical displacement calculated in operation 926.

In operation 930, the calculation unit 222 calculates a proper rolling angle for the fourth captured image 116. In operation 932, the image aligning unit 224 rotates the fourth captured image 116 by the calculated proper rolling angle calculated in operation 930.

In operation 934, the mapping unit 220 projects the fourth captured image onto the predetermined cylindrical surface so as to form a fourth projection image 117.

In operation 936, the calculation unit 222 calculates a proper panning angle and a proper vertical displacement for the fourth projection image 117. In operation 938, the image aligning unit 224 moves the fourth projection image 117 by the calculated proper panning angle and vertical displacement calculated in operation 936.

In operation 940, the image aligning unit 224 stitches the first and second projection images 111 and 113 together, the second and third projection images 113 and 115 together, and the third and fourth projection images 115 and 117 together, in order to create a single-row panoramic image.

The first, second, third, and fourth projection images 111, 113, 115, and 117 can be stitched in a different manner from that in operation 940. That is, the first and second projection images 111 and 113 can be stitched after operation 918, and the second and third projection images 113 and 115 can be stitched after operation 928. Then, the third and fourth projection images 115 and 117 can be stitched after operation 938.

Figure 10A:
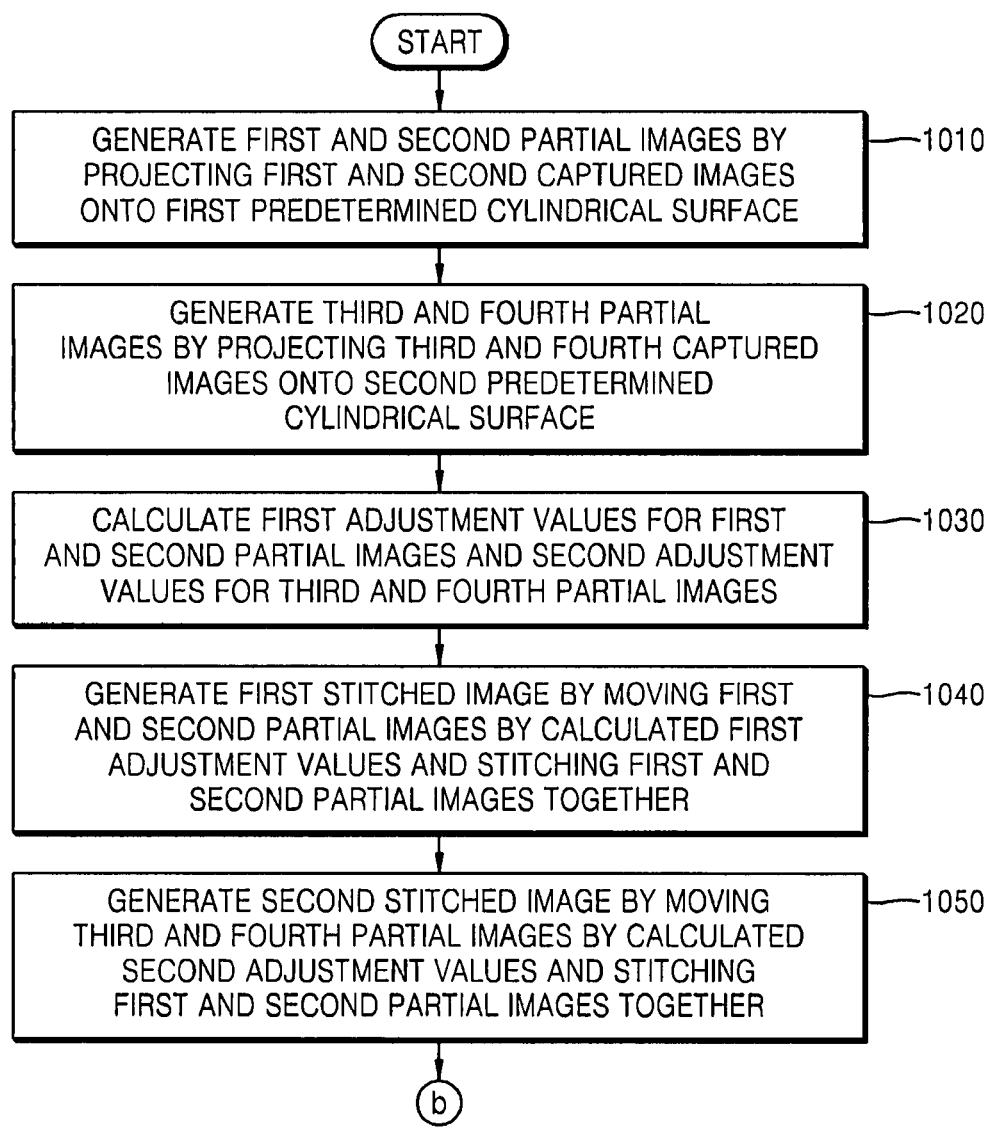
FIGS. 10A and 10B are flowcharts for explaining, in more detail, operation 720 of the method of FIG. 7 when a multi-row panoramic image is generated according to an exemplary embodiment.
Figure 10B:
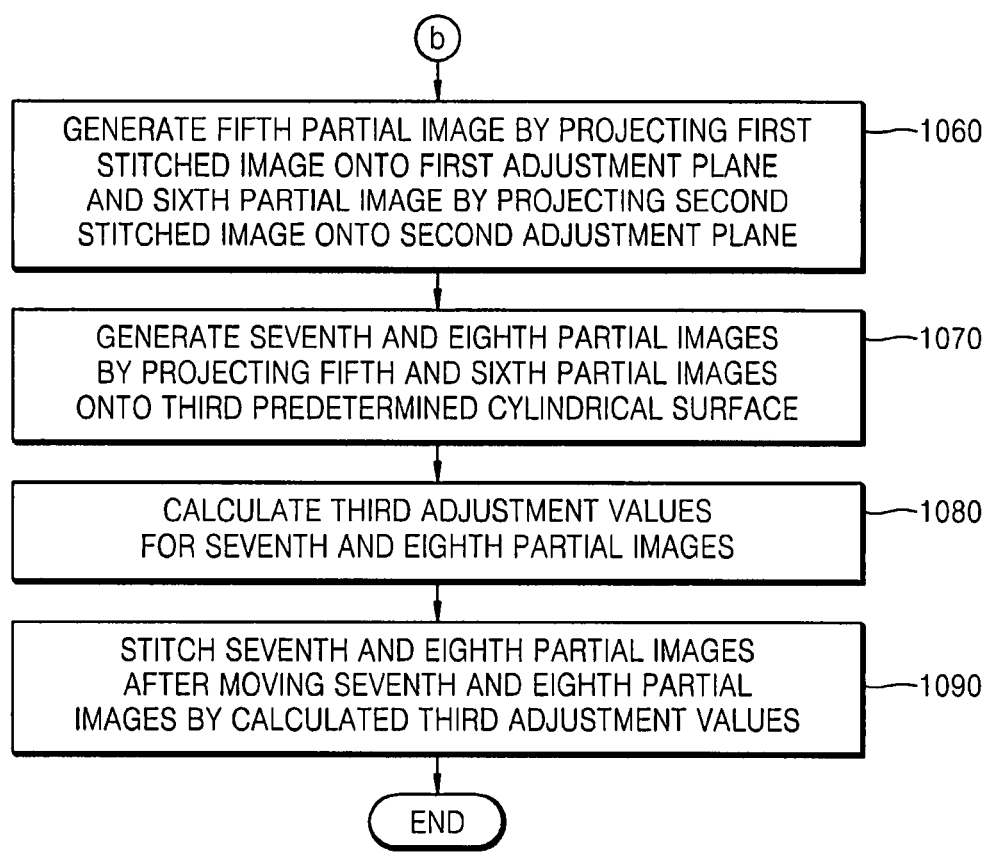

FIGS. 10A and 10B are flowcharts for explaining, in more detail, operation 720 (denoted here as 720B) of the method illustrated with reference to FIG. 7 when a multi-row panoramic image is generated according to an exemplary embodiment. Operation 720B may include operations 1010 through 1090 for generating a multi-row panoramic image using first, second, third, and fourth captured images 150, 152, 154, and 156. For clarity, the current exemplary embodiment describes only the case where proper movement values are calculated with respect to a cylindrical surface instead of a spherical surface so as to reduce calculation load in generating a multi-row panoramic image.

In operation 1010, the mapping unit 220 projects the first and second captured images 150 and 152 onto a first predetermined cylindrical surface so as to form first and second partial images (not shown). In operation 1020, the mapping unit 220 projects the third and fourth captured images 154 and 156 onto a second predetermined cylindrical surface so as to form third and fourth partial images. As illustrated in FIG. 10, operation 1020 can be performed after operation 1010. Alternatively, operation 1020 can be performed prior to operation 1010 or at the same time as operation 1010.

In operation 1030, the calculation unit 222 calculates first adjustment values for the first and second partial images and second adjustment values for the third and fourth partial images.

In operation 1040, the image aligning unit 224 moves the first and second partial images by the first adjustment values and stitches the first and second partial images together so as to form a first stitched image.

In operation 1050, the image aligning unit 224 moves the third and fourth images by the second adjustment values and stitches the third and fourth images partial together so as to form a second stitched image.

As shown in FIG. 10, operation 1050 can be performed after operation 1040. Alternatively, operation 1050 can be performed prior to or simultaneously with operation 1040.

In operation 1060, the mapping unit 220 projects the first stitched image onto a first adjustment plane so as to form a fifth partial image (not shown) and projects the second stitched image onto a second adjustment plane so as to form a sixth partial image (not shown).

In operation 1070, the mapping unit 210 projects the fifth and sixth partial images onto a third predetermined cylindrical surface so as to form seventh and eighth partial images (not shown).

In operation 1080, the calculation unit 222 calculates third adjustment values for the seventh and eighth partial images. In operation 1090, the image aligning unit 224 moves the seventh and eighth partial images by the third adjustment values and stitches the seventh and eighth partial images together.

As described above, according to the apparatus for and method of generating a panoramic image, overlapped sections of neighboring images can be precisely superposed and aligned even when the images are captured at different angles while moving a photographing device such as a case where images are captured in different directions while a photographer moves a photographing device, which is held in his/her hand, along a predetermined path.

Furthermore, when proper movement values are calculated for images to be stitched, the proper movement values may be not calculated for images that have already assigned proper movement values so as to rapidly create a panoramic image. However, even when proper movement values are recalculated for images that have already assigned proper movement values, a panoramic image can be rapidly created since three rotation angles, and thus the proper movement values, about three axes such as x, y, and z-axes can be converted into equivalent three rotation angles about two axes.

In particular, when a plurality of image are stitched together for generating a multi-row panoramic image, proper movement values are calculated for two neighboring images only when the two neighboring images can be fully overlapped with each other by moving one of the two neighboring images in one direction such as a rolling direction or a panning direction (that is, only when center points of two neighboring images having the same shape and size are placed on an equator or a longitudinal line of a sphere). That is, proper shifts value are not calculated for two neighboring images when the two neighboring images can be fully overlapped with each other by moving one of the two neighboring images in two or more directions such as rolling and panning directions (that is, when center points of two neighboring images having the same shape and size are placed on a line parallel with an equator of a sphere). Therefore, proper movement values can be rapidly calculated for the plurality of images, so that a multi-row panoramic image can be created more rapidly using the plurality of images. That is, as described above, although it is necessary to stitch the first and second partial images together and the third and fourth partial images together so as to create a multi-row panoramic image, stitching of the first and fourth partial images is not necessary for creating the multi-row panoramic image.

Furthermore, according to an exemplary embodiment, when proper movement values are calculated with respect to the rolling, panning, and vertical directions of the photographing device, a proper movement value in one direction (e.g., the rolling direction) is calculated for a low-resolution image, and a proper movement value in another direction (e.g., the panning direction or the vertical direction) is calculated for a high-resolution image. That is, different proper movement values can be calculated for images having different resolutions according to the directions of the photographing device. Therefore, a proper movement value, which is expected to be calculated with less time but to be precise, is assigned for a high-resolution image so as to provide a proper movement value with high precision. Further, a proper movement value, which is expected to be calculated with less time and precision, is assigned for a low-resolution image so as to provide a proper movement value more rapidly.

According to exemplary embodiments, after a panoramic image is generated using a previously captured image and a currently captured image that are stored in a memory (e.g., the image storage unit 214), the previously captured images are deleted. Therefore, a low-capacity memory can be used for generating a panoramic image using a plurality of images.

Therefore, according to the apparatus, method, and medium for generating a panoramic image, a realistic panoramic image can be rapidly generated using a low-capacity memory. Thus, exemplary embodiments can be employed in a personal computer (PC) and a portable terminal having a low calculation capability and storage capacity as compared with usual computers such as a PC.

According to exemplary embodiments, a predetermined section of a previously captured image can be displayed on the display unit together with a preview image, so that a photographer can conveniently determine the photographing orientation of the photographing device using the predetermined section of the previously captured image as a guide image.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

Although a few exemplary embodiments have been shown and described, it would be appreciated by those skilled in the art that changes may be made in these exemplary embodiments, the scope of which is defined in the claims and their equivalents.

What is claimed is:

1. An apparatus for generating a panoramic image, comprising:
    a mapping unit to project a previously captured image and a currently captured image onto a predetermined curved surface so as to form a first mapping image and a second mapping image, respectively;
    a calculation unit, executed by at least one processor, to calculate movement values in predetermined directions for maximizing a color similarity between overlapped sections of the first and second mapping images, by using candidate movement value of each of the predetermined directions; and
    an image aligning unit to generate a panoramic image using the first and second mapping images and the calculated movement values,
    wherein the predetermined directions include at least one of pitching direction, a panning direction, a rolling direction and a vertical displacement,
    wherein the calculation unit calculates the movement values after projecting one of the first and the second mapping image onto a plane including the other without considering a focal length of the apparatus, and
    wherein the candidate movement value is selected by the calculation unit among preset angles in each of the predetermined directions.

2. The apparatus of claim 1, wherein the previously captured image is not the captured image that is first captured in a series of images captured for generating a panoramic image, and the calculation unit calculates the movement value for the currently captured image or the second mapping image.

3. The apparatus of claim 1, wherein the calculation unit calculates the movement value after decreasing resolutions of the previously and currently captured images or resolutions of the first and second mapping images depending on the predetermined direction.

4. The apparatus of claim 3, wherein the calculation unit increases the resolutions of the previously and currently captured images or the resolutions of the first and second mapping images after calculating the movement value, and then recalculates the movement value in consideration of the immediately previously calculated movement value.

5. The apparatus of claim 1, wherein the calculation unit comprises:
  a first movement value calculator to calculate the movement value in a first predetermined direction for at least one of the previously and currently captured images; and
  a second movement value calculator to calculate the movement value in a second predetermined direction for at least one of the first and second mapping images.

6. The apparatus of claim 1, further comprising a display unit including first and second screen regions, wherein the display unit displays a predetermined portion of the previously captured image in the first screen region and a preview image to be captured as the currently captured image in a region including the second screen region.

7. The apparatus of claim 6, wherein the display unit displays the preview image on the second screen region.

8. The apparatus of claim 6, wherein the display unit displays at least a portion of the preview image together with the predetermined portion of the previously captured image in the first screen region.

9. The apparatus of claim 1, further comprising:
  an image storage unit to store the captured images; and
  a deleting unit to delete the previously captured image from the image storage unit after the panoramic image is generated.

10. The apparatus of claim 1, wherein the mapping unit comprises:
  a position information storage to store information about positions of pixels of the captured image and positions of the predetermined curved surface which are matched to the positions of the pixels of the captured image; and
  a color allotter to extract information about the positions of the predetermined curved surface which are matched to the positions of the pixels of the captured image and assigning color values of the pixels of the captured image to the positions represented in the extracted information.

11. A method of generating a panoramic image, comprising:
  projecting a previously captured image and a currently captured image onto a predetermined curved surface so as to form a first mapping image and a second mapping image, respectively;
  calculating, performed by at least one processor, movement values in predetermined directions for maximizing a color similarity between overlapped sections of the first and second mapping images, by using candidate movement value of each of the predetermined directions; and
  generating a panoramic image using the first and second mapping images and the calculated movement values,
  wherein the predetermined directions include at least one of a pitching direction, a panning direction, a rolling direction and a vertical displacement,
  wherein the movement values are calculated after projecting one of the first and the second mapping image onto a plane including the other without considering a focal length of a apparatus for generating the panoramic image, and
  wherein the candidate movement value is selected by the calculation unit among preset angles in each of the predetermined directions.

12. The method of claim 11, wherein the previously captured image is not the captured image that is first captured in a series of images captured for generating a panoramic image, and the movement values in predetermined directions are for the currently captured image or the second mapping image.

13. The method of claim 11, wherein the calculating movement values calculates the movement value after decreasing resolutions of the previously and currently captured images or resolutions of the first and second mapping images depending on the predetermined direction.

14. A non-transitory computer-readable recording medium storing a computer-readable program for executing a method of generating a panoramic image, the method comprising:
  projecting a previously captured image and a currently captured image onto a predetermined curved surface so as to form a first mapping image and a second mapping image, respectively;
  calculating movement values in predetermined directions for maximizing a color similarity between overlapped sections of the first and second mapping images, by using candidate movement value of each of the predetermined directions; and
  generating a panoramic image using the first and second mapping images and the calculated movement values,
  wherein the predetermined directions include at least one of a pitching direction, a panning direction, a rolling direction and a vertical displacement,
  wherein the movement values are calculated after projecting one of the first and the second mapping image onto a plane including the other without considering a focal length of a apparatus for generating the panoramic image, and
  wherein the candidate movement value is selected by the calculation unit among preset angles in each of the predetermined directions.

* * * * *